(12) United States Patent
Morishima et al.

(10) Patent No.: US 6,890,608 B2
(45) Date of Patent: May 10, 2005

(54) OPTICAL COMPENSATORY SHEET, LIQUID-CRYSTAL DISPLAY AND ELLIPTICAL POLARIZING PLATE EMPLOYING SAME

(75) Inventors: Shinichi Morishima, Minami-ashigara (JP); Ken Kawata, Minami-ashigara (JP); Terukazu Yanagi, Minami-ashigara (JP)

(73) Assignee: Fuji Photo Film Co., Ltd., Minam-Ashigara (JP)

( * ) Notice: Subject to any disclaimer, the term of this patent is extended or adjusted under 35 U.S.C. 154(b) by 0 days.

(21) Appl. No.: 10/400,520

(22) Filed: Mar. 28, 2003

(65) Prior Publication Data

US 2003/0223026 A1 Dec. 4, 2003

(30) Foreign Application Priority Data

Mar. 29, 2002 (JP) .......... 2002-093685
Mar. 29, 2002 (JP) .......... 2002-093686

(51) Int. Cl.$^7$ .......... G02B 5/30; G02F 1/13363
(52) U.S. Cl. .......... 428/1.3; 428/1.31; 428/1.1; 349/117
(58) Field of Search .......... 428/1.1, 1.3, 1.31; 349/117; 252/299.01, 299.5, 299.62

(56) References Cited

U.S. PATENT DOCUMENTS 5,667,854 A * 9/1997 Yamada .......... 428/1.31

FOREIGN PATENT DOCUMENTS

JP 2000-56310 * 2/2000
JP 2001-330725 * 11/2001

OTHER PUBLICATIONS

English translation by computer for JP 2000–56310, http://www4.ipdl.jpo.go.jp/Tokujitu/PAJdetail.ipdl?N0000=60&N0120=01&N2001=2&N3001=2000–056310*
English trnalation by computer for JP 2001–330725, http://www4.ipdl.jpo.go.jp/Tokujitu/PAJdetail.ipdl?N0000=60&N0120=01&N2001=2&N3001=2001–330725.*

* cited by examiner

Primary Examiner—Shean C. Wu
(74) Attorney, Agent, or Firm—Burns, Doane, Swecker & Mathis, L.L.P.

(57) ABSTRACT

A novel optical compensatory sheet is disclosed the sheet comprises a transparent support and an optically anisotropic layer formed of discotic liquid-crystal molecules thereon. The anisotropic layer comprises at least one air interface control agent, thereby having an air interface polarity of at least 1.5-fold relative to that of a layer which does not comprise said air interface control agent. An optical compensatory sheet comprising a transparent support and an optically anisotropic layer formed of discotic liquid-crystal molecules thereon, wherein said anisotropic layer comprises at least one compound denoted by formula (I) is also disclosed Formula (I)

$(R^0)_{\overline{m}}L^0\text{---}(W)_n.$

34 Claims, 1 Drawing Sheet

(a)

(b)

(c)

OPTICAL COMPENSATORY SHEET, LIQUID-CRYSTAL DISPLAY AND ELLIPTICAL POLARIZING PLATE EMPLOYING SAME

TECHNICAL FIELD

The present invention relates to the optical compensatory sheets employed in elliptical polarizing plates and liquid-crystal displays, and to elliptical polarizing plates and liquid-crystal displays employing the same.

DESCRIPTION OF RELATED ART

Liquid-crystal displays are comprised of a liquid-crystal cell, polarizing elements, and optical compensatory sheets (phase differential sheets). In transmitting liquid-crystal displays, two plates of polarizing elements are mounted on either side of a liquid-crystal cell, and one or two optical compensatory sheets are positioned between the liquid-crystal cell and the polarizing elements. In reflecting liquid-crystal displays, a reflective plate, a liquid-crystal cell, an optical compensatory sheet, and a polarizing element sheet are sequentially positioned. The liquid-crystal cells are comprised of rod-shaped liquid-crystal elements, two substrates for sealing these elements, and two electrode layers for applying a voltage to the rod-shaped liquid-crystal elements. Liquid-crystal cells, varying according to the alignment of the rod-shaped liquid-crystal molecules, have been proposed in a variety of modes: transmitting types include twisted nematic (TN), in-plane switching (IPS), ferroelectric liquid crystal (FLC), optically compensatory bend (OCB), super-twisted nematic (STN), and vertically aligned (VA) liquid-crystal cells; while reflecting types include TN, hybrid aligned nematic (HAN), and guest-host (GH) liquid-crystal cells.

Optical compensatory sheets are employed in a variety of liquid-crystal displays to eliminate image coloration and broaden the viewing angle. Stretched birefringent films have conventionally been employed as optical compensatory sheets. Further, in recent years, instead of optical compensatory sheets comprised of stretched birefringent films, the use of optical compensatory sheets having an optically anisotropic layer formed of discotic liquid-crystal molecules on a transparent support has been proposed. The optically anisotropic layer is formed by coating a discotic liquid-crystal composition comprising discotic liquid-crystal molecules on an alignment layer and aligning the discotic liquid-crystal molecules by heating to a temperature exceeding the orientation temperature. Generally, discotic liquid-crystal molecules are highly birefringent. Further, discotic liquid-crystal molecules have various orientation modes. The use of discotic liquid-crystal molecules permits the achievement of optical properties that are unachievable in conventional stretched birefringent films.

The optical properties of optical compensatory sheets are determined by the optical properties of the liquid-crystal cells, and more particularly, by differences in the above-described display modes. Using discotic liquid-crystal molecules permits the manufacturing of optical compensatory sheets having various optical properties corresponding to the various display modes of liquid-crystal cells. Various optical compensatory sheets employing discotic liquid-crystal molecules corresponding to various display modes have already been proposed. For example, optical compensatory sheets for TN-mode liquid-crystal cells are described in Japanese JP-A No.hei 6-214116 (the term "JP-A" as used herein means an "unexamined published Japanese patent application"), U.S. Pat. Nos. 5,583,679 and 5,646,703, and German Patent No. 3,911,620A1. Optical compensatory sheets for IPS-mode and FLC-mode liquid-crystal cells are described in JP-A No. hei 10-54982. Optical compensatory sheets for OCB-mode and HAN-mode liquid-crystal cells are described in U.S. Pat. No. 5,805,253 and International Patent Application No. WO96/37804. Still further, optical compensatory sheets for STN-mode liquid-crystal cells are described in JP-A No. hei 9-26572. And optical compensatory sheets for VA-mode liquid-crystal cells are described in Japanese Patent No. 2,866,372.

JP-A No. hei 6-214116, U.S. Pat. Nos. 5,583,679 and 5,646,703, and German Patent No. 3,911,620A1 propose optical compensatory sheets having an optically anisotropic layer comprised of discotic liquid-crystal molecules aligned at an mean tilt angle of 5 to 50°. In the optically anisotropic layer, the discotic liquid-crystal molecules are aligned so that the tilt angle varies with the distance from the surface of a transparent support. These optical compensatory sheets are useful to broaden the viewing angle of TN-mode liquid-crystal displays. However, when the present inventors actually employed these optical compensatory sheets, optical leaks were found in the direction of incline of the polarizing plate, and it was determined that the viewing angle had not been adequately broadened (to the degree that would be theoretically anticipated). One reason for the inadequate optical compensation function is that the tilt angle of the discotic liquid crystal molecules cannot be adequately ensured. To solve this problem, JP-A No. 2001-330725 proposes the addition of a fluorine compound having a fluorine-substituted alkyl group and hydrophilic group to the optically anisotropic layer. When this fluorine compound is added to the optically anisotropic layer, it is possible to increase the tilt angle of the discotic liquid-crystal molecules, resulting in a broader viewing angle.

Recently, it has been determined that the use of discotic liquid-crystal molecules comprising benzene rings and double bonds conjugated thereto and having a molecular structure in which side chains are bonded to a disk-shaped nucleus is desirable in optical compensatory sheets due to inherently high birefringence. However, the use of discotic liquid-crystal molecules of inherently high birefringence creates a problem in that the angle of incline of the discotic liquid-crystal molecules is clearly inadequate. Thus, the fluorine compound described in JP-A No. 2001-330725 requires that a compound be added that is capable of increasing the tilt angle of the discotic liquid-crystal molecules.

SUMMARY OF THE INVENTION

Accordingly, the present invention has for its object to increase the tilt angle of discotic liquid-crystal molecules in an optically anisotropic layer formed of discotic liquid-crystal molecules aligned at the tilt angle of which varies with the distance from the surface of a transparent support. A further object of the present invention is to provide an optical compensatory sheet capable of correctly optically compensating TN-mode liquid-crystal cells. And a still further object of the present invention is to provide an elliptical polarizing plate capable of broadening the viewing angle of the liquid-crystal display, and a liquid-crystal display with a broadened viewing angle.

In one aspect, the present invention provides an optical compensatory sheet comprising a transparent support and an optically anisotropic layer formed of discotic liquid-crystal molecules thereon, wherein the anisotropic layer comprises at least one air interface control agent, thereby having an air interface polarity of at least 1.5-fold relative to that of a layer which does not comprise said air interface control agent.

In another aspect, the present invention provides an optical compensatory sheet comprising a transparent support and an optically anisotropic layer formed of discotic liquid-crystal molecules thereon; wherein said anisotropic layer comprises at least one compound denoted by formula (I) is also disclosed.

Formula (I):

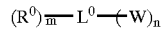

wherein $R^0$ denotes an alkyl group, alkyl group having a terminal $CF_3$ group, or alkyl group having a terminal $CHF_2$ group and not fewer than 8 carbon atoms; m denotes an integer greater than or equal to 2, where multiple occurrences of $R^0$ may be identical or different, with at least one denoting an alkyl group having a terminal $CF_3$ group, or with at least two denoting alkyl groups having terminal $CHF_2$ groups and not fewer than 8 carbon atoms; $L^0$ denotes a linking group of valence (m+n); W denotes a hydrophilic group; and n denotes an integer greater than or equal to 1.

In another aspect, the present invention provides an elliptical polarizing plate comprising a polarizing film and said optical compensatory sheet.

In another aspect, the present invention provides a transmitting liquid-crystal display equipped with a TN-mode liquid-crystal cell with two polarizing plates, one positioned on either side thereof, wherein the optical compensatory sheet is positioned between at least one of said two polarizing plates and said liquid-crystal cell; and the transmitting liquid-crystal display comprising a TN-mode liquid-crystal cell with two polarizing plates, one positioned on either side thereof, wherein at least one of said two polarizing plates is an elliptical polarizing plate in which are sequentially laminated an optically anisotropic layer formed of discotic liquid-crystal molecules, a transparent substrate, a polarizing film, and a transparent protective film; the tilt angle of said discotic liquid-crystal molecules varies with the distance between said discotic liquid-crystal molecules and the surface of said transparent support; and said optically anisotropic layer further comprises a compound denoted by the formula (I).

In the present Specification, the term "tilt angle of discotic liquid-crystal molecules" means the angle between the disk surface of the discotic liquid-crystal molecules and the plane of the transparent support.

DESCRIPTION OF THE PREFERRED EMBODIMENTS

[The Optical Compensatory Sheet]

Figure 1:
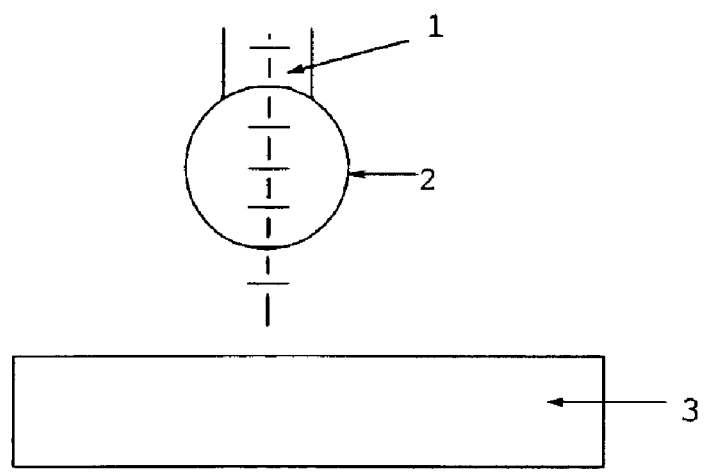
FIGS. 1(a) to (c) are schematic diagrams showing an example of a method for measuring contact angles.
Figure 1:
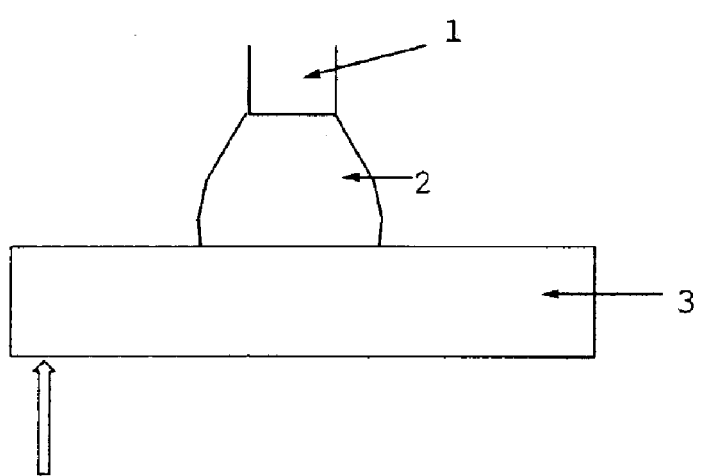
Figure 1:
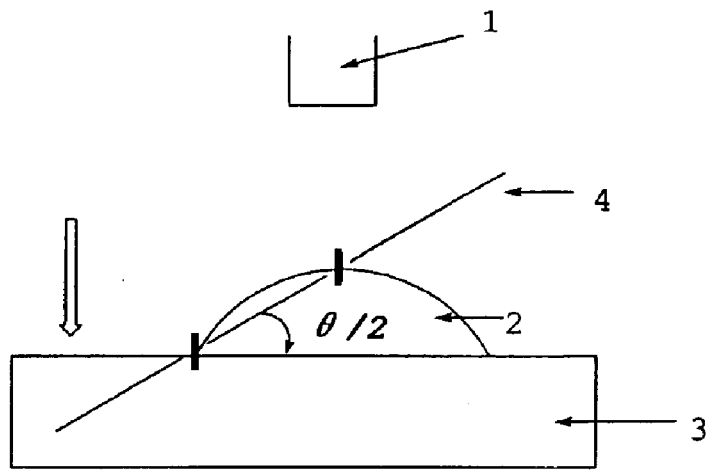

The optical compensatory sheet of the present invention comprises a transparent support, and thereupon, an optically anisotropic layer formed of discotic liquid-crystal molecules. The tilt angle of discotic liquid-crystal molecules in the optically anisotropic layer changes with the distance between the discotic liquid-crystal molecules and the surface of the transparent support. The specific alignment of the discotic liquid-crystal molecules is determined by the type of display mode of the liquid-crystal cells. The alignment of the liquid crystal molecules is controlled by the species of discotic liquid-crystal molecule, species of alignment layer, fluorine compounds (described further below), and other additives employed in the optically anisotropic layer (for example, plasticizers, binders, and surfactants).

Discotic liquid-crystal molecules have been variously described in the literature (Mol. Crysr. Liq. Cryst., vol. 71, page 111 (1981), C. Destrade et al.; Quarterly Chemistry Survey, No. 22, The Chemistry of Liquid Crystals, Chapter 5, Chapter 10, Section 2 (1994), ed. by Japan Chem. Soc.; Angew. Chem. Soc. Chem. Comm., page 1794 (1985), B. Kohne et al.; J. Am. Chem. Soc., vol. 116, page 2,655 (1994), J. Zhang et al.). The polymerization of discotic liquid-crystal molecules is described in JP-A No. hei8-27284. It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during the polymerization reaction. Accordingly, the discotic liquid-crystal molecule desirably comprises a linking group between the disk-shaped core and the polymerizable group. That is, the discotic liquid-crystal molecule is desirably the compound denoted by formula (V) below.

 Formula (V)

In the formula, D denotes the disk-shaped core, L denotes a bivalent linking group, Q denotes a polymerizable group, and n denotes an integer of from 4 to 12. Examples of disk-shaped core (D) in the above formula are given below. In the various examples below, LQ (or QL) denotes the combination of a bivalent linking group (L) with a polymerizable group (Q).

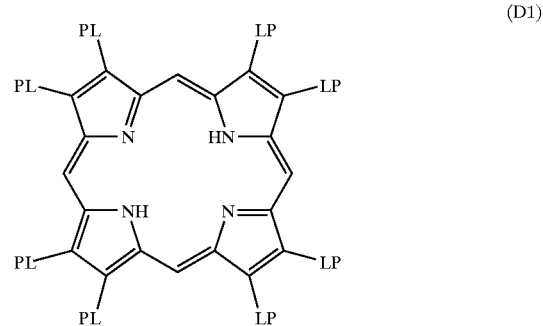
(D1)

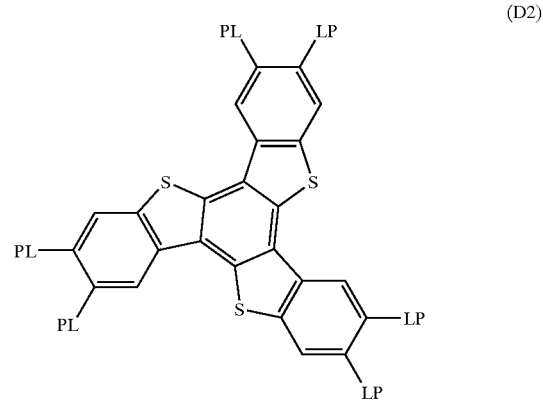
(D2)

(D3) 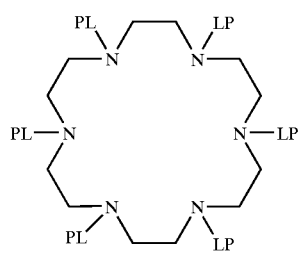
(D4) 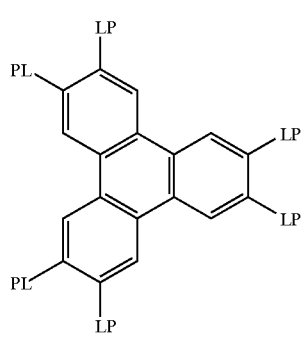
(D5) 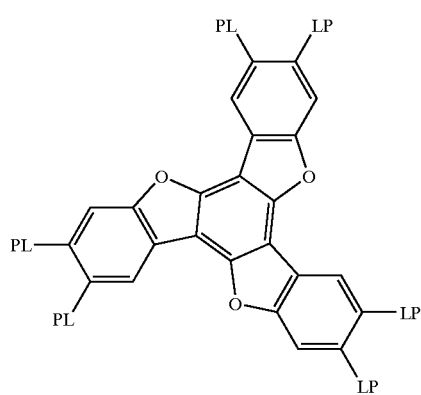
(D6)
(D7) 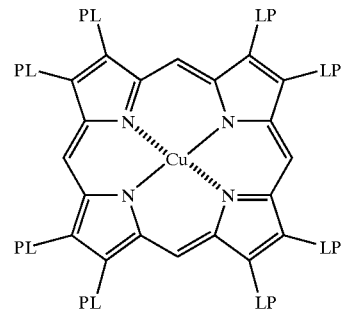
(D8) 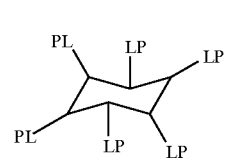
(D9) 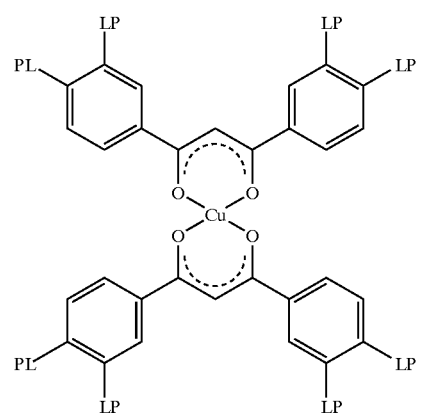
(D10) 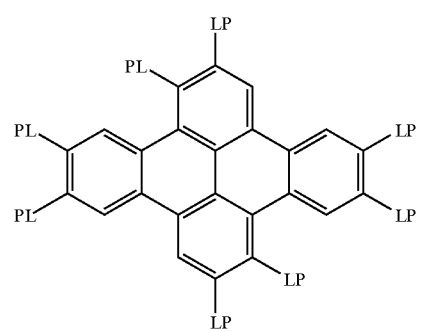

(D11)
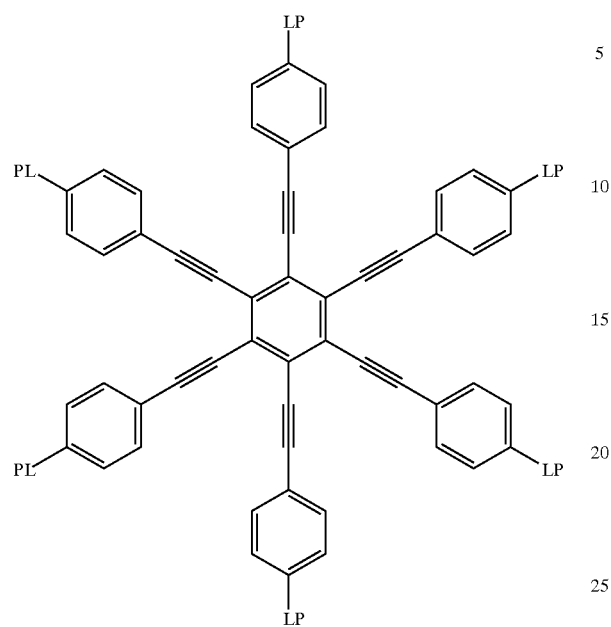
(D13)
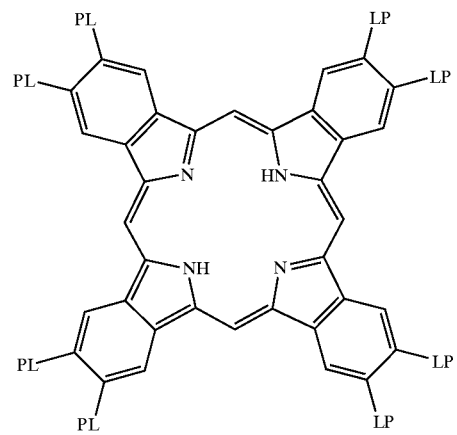
(D12)
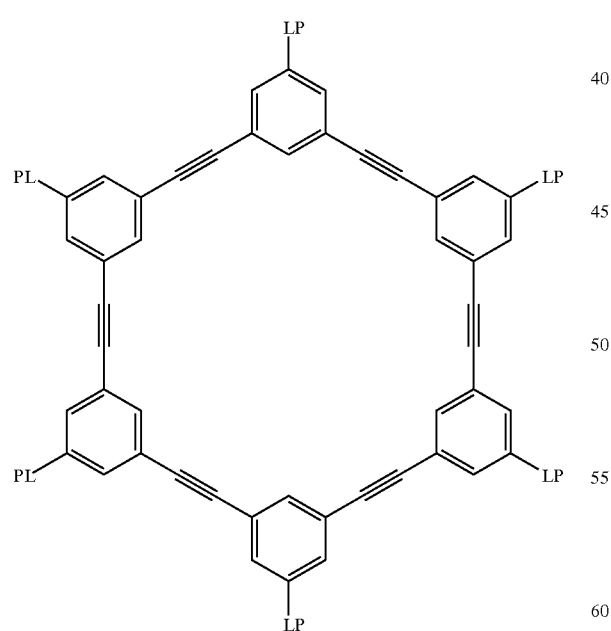
(D14)
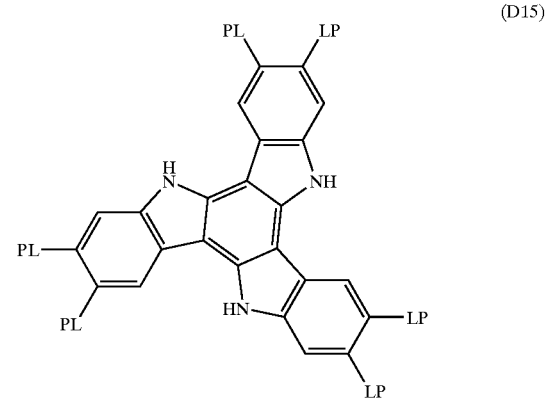
(D15)

In the above formula, bivalent linking group (L) is desirably a bivalent linking group selected from the group consisting of alkylene groups, alkenylene groups, arylene groups, —CO—, —NH—, —O—, —S—, and combinations thereof. Bivalent linking group (L) is preferably a group combining at least two bivalent groups selected from the group consisting of alkylene groups, alkenylene groups, arylene groups, —CO—, —NH—, —O—, and —S—. Most preferably, bivalent linking group (L) is a group combining at least two bivalent groups selected from the group consisting of alkylene groups, alkenylene groups, arylene groups, —CO—, and —O—. The alkylene groups desirably comprise from 1 to 12 carbon atoms. The alkenylene groups desirably comprise form 2 to 12 carbon atoms. The arylene groups desirably comprise from 6 to 10 carbon atoms. The alkylene groups, alkenylene groups, and arylene groups may have substituents (for example, alkyl groups, halogen atoms, cyano, alkoxy groups, and acyloxy groups).

Bivalent linking group (L) desirably comprises a benzene ring and a conjugate double bond. That is, an arylene group and an alkinylene group are desirably adjacent, with the benzene ring of the arylene group conjugated to the double bond of the alkinylene group. Examples of bivalent linking group (L) are given below. It is bonded on the left to disk-shaped core (D) and on the right to polymerizable group (Q). AL denotes an alkylene group or alkenylene group, and AR denotes an arylene group.

L1: —AL—CO—C—AL—
L2: —AL—CO—C—AL—C—
L3: —AL—CO—O—AL—O—AL—
L4: —AL—CO—C—AL—C—CO—
L5: —CO—AR—C—AL—
L6: —CO—AR—C—AL—C—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

When bivalent linking group (L) comprises a benzene ring and a double bond conjugated thereto, above-described L16 is particularly desirable. That is, it is particularly desirable for the benzene ring of the AR (arylene group) of L16 to be conjugated to the double bond of the adjacent AL (alkinylene group) on the left. Polymerizable group (Q) in formula (V) is determined by the type of polymerization reaction. Examples of polymerizable group (Q) are given below.

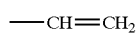 (Q-1)

—CH=CH—CH₃ (Q-2)

—CH=CH—C₂H₅ (Q-3)

—CH=CH—n-C₃H₇ (Q-4)

$$\text{—C=CH}_2 \atop |\ \ \text{CH}_3$$ (Q-5)

$$\text{—CH=C—CH}_3 \atop |\ \ \text{CH}_3$$ (Q-6)

—C≡CH (Q-7)

 (Q-8)

(Q-9)

—SH (Q-10)

—CHO (Q-11)

—OH (Q-12)

—CO₂H (Q-13)

—N=C=O (Q-14)

—NH₂ (Q-15)

—SO₃H (Q-16)

—N=C=S (Q-17)

Polymerizable group (Q) is desirably an unsaturated polymerizable group (Q-1 to Q-7), an epoxy group (Q-8), or an aziridinyl group (Q-9); preferably an unsaturated polymerizable group; and most preferably, an ethylenic unsaturated polymerizable group (Q-1 to Q-6).

In formula (V), n denotes an integer of from 4 to 12. The specific number is determined based on the type of discotic core (D). In combinations of multiple L and Q, they may be different, but are desirably identical.

Two or more species of discotic liquid-crystal molecules may be employed in combination. For example, the above-described polymerizable discotic liquid-crystal molecule and a nonpolymerizable discotic liquid-crystal molecule may be employed in combination. The nonpolymerizable discotic liquid-crystal molecule may be a compound in which polymerizable group (Q) of the above-described polymerizable discotic liquid-crystal molecule has been replaced with a hydrogen atom or alkyl group. That is, the nonpolymerizable discotic liquid-crystal molecule is desirably a compound having formula (VI) below.

D-(L-R)ₙ      Formula (VI)

In the formula, D denotes a disk-shaped core, L denotes a bivalent linking group, R denotes a hydrogen atom or alkyl group, and n denotes an integer of from 4 to 12. The example of disk-shaped core (D) in formula (V), with the exception that LP (or PL) is changed to LR (or RL), is identical to the example of the above-described polymerizable discotic liquid-crystal molecule. Further, the example of bivalent linking group (L) is identical to the example of the above-described polymerizable discotic liquid-crystal molecule.

The alkyl group denoted by R desirably has 1 to 40, and preferably 1 to 30, carbon atoms. A chain-shaped alkyl group is preferred to a cyclic alkyl group, and a straight-chain alkyl group is preferred over a branching chain alkyl group. It is particularly desirable for R to denote a hydrogen atom or a straight-chain alkyl group having from 1 to 30 carbon atoms.

According to the present invention, the above-described optically anisotropic layer further comprises an air interface control agent. In this Specification, "air interface control agent" means an agent, when the agent is added to a layer, capable of being localized in air interface area of the layer and of controlling film properties (interfacial properties) of the layer. One embodiment of the present invention is the compensatory sheet comprising the optically anisotropic layer which comprises an air interface control agent, thereby having the air interface polarity of at least 1.5-fold relative to that of an optically anisotropic layer not containing the agent. The "air interface polarity" is defined as a ratio of a polar force component and a dispersion force component which can be determined by measurement of contact angles of the layer.

It has been understood that the variation in the tilt angle of a discotic liquid crystal compound in an layer, formed on a support having an alignment layer thereon, depending on the distance from the surface of the support may be caused by a difference between the surface of the alignment layer and an air interface. Thus, when the agent is localized in the air interface of the layer, so as that the difference in polarity between the alignment layer and the air interface is large, a sufficient increase in the tilt angle of the discotic liquid crystal compound can be obtained. Therefore, according to the present invention, the air interface control agent is desirably capable being localized in the air interface so as to increase the polarity. The air interface polarity of the optically anisotropic layer to which is added the air interface control agent, is preferably at least 1.5-fold, more preferably at least 4-fold, and much more preferably at least 6-fold relative to that of an optically anisotropic layer not containing the agent. If the increase of the air interface polarity is smaller than the above described range, the difference in the polarity between the surface of the alignment layer and the air interface is so small that a sufficient increase in the tilt angle of the discotic liquid crystal compound cannot be obtained.

Even though an agent has a low ability to control air interface of a layer, the layer containing such agent with a large amount may have an increased air interface polarity. However, the lager amount of the agent is, the more inhibition of an alignment of the discotic liquid crystal compound is. According to the present invention, the amount of the air interface agent in the optically anisotropic layer is desirably 0.01 to 1 weight % with respect to weight of the discotic liquid crystal compound and the air interface control agent is desirably capable of increasing the air interface polarity by at least 1.5-fold relative to that of an optically anisotropic layer not containing the agent. The amount of the air interface agent in the optically anisotropic layer is preferably 0.01 to 0.1 weight %, more preferably 0.01 to 0.05 weight % with respect to weight of the discotic liquid crystal compound.

According to the present invention, an air interface polarity of an optically anisotropic layer can be determined as follows.

After an alignment layer and an optically anisotropic layer is subsequently formed on a transparent support, the sample is left for an hour under an atmosphere in which the temperature and the humidity are respectively controlled at 25° C. and 60% RH. After that, the contact angles of pure water and methylene iodide on the optically anisotropic layer are measured and the measurement values are applied to the mathematical formulas 1 to 3, so as that a surface free energy ($\gamma_s$), a dispersion force component ($\gamma_s^d$) and a polar force component ($\gamma_s^p$) of the optically anisotropic layer can be determined. The air interface polarity is defined as a ratio of the polar force component to the dispersion force component, namely a value of ($\gamma_s^p/\gamma_s^d$).

$$\sqrt{\gamma_{s_d}}=4.038 \cos \Theta_{CH_2I_2}-0.9241 \cos \Theta_{H_2O}+3.114 \quad\quad 1$$

$$\sqrt{\gamma_{s^p}}=-2.641 \cos \Theta_{CH_2I_2}+5.701 \cos \Theta_{H_2O}+3.061 \quad\quad 2$$

$$\gamma_s=(\sqrt{\gamma_{s^d}})^2+(\sqrt{\gamma_{s^p}})^2 \quad\quad 3$$

FIGS. 1(a) to (c) are schematic diagrams showing an example of a method for measuring contact angles.

As shown in FIG. 1(a), a micrometer 1 is spun so as to form a drop 2 at a needle point. As shown FIG. 1(b), the drop 2 is put on an optical isotropic layer 3 by elevating a stage supporting the optically anisotropic layer 3 thereon. Subsequently, as shown in FIG. 1(c), by taking down the stage, the drop 2 can be easily separated from the micrometer 1, and is left on the optically anisotropic layer 3. After 20 seconds, a line 4 connecting a top and a left contact point of the drop 2 is drawn, an angle (shown as θ/2 in FIG. 1(c)) between the line 4 and the surface of the optically anisotropic layer 3 is measured. Twice of the measured angle is a contact angle (θ).

As far as having said properties, any air interface control agents can be used in the present invention, and the structures of the agents are not limited. Among them, fluorine-containing surfactants are desirable, and the compounds represented by formula (I) bellow are more desirable.

Formula (I)

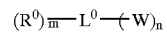

In the formula, $R^0$ denotes an alkyl group, alkyl group having a terminal $CF_3$ group, or alkyl group having a terminal $CHF_2$ group and not fewer than 8 carbon atoms, and m denotes an integer greater than or equal to 2. Multiple occurrences of $R^0$ may be identical or different, but at least one of them is an alkyl group having a terminal $CF_3$ group, or at least two of them are alkyl groups having terminal $CHF_2$ groups and not fewer than 8 carbon atoms. $L^0$ denotes a linking group of valence (m+n), W denotes a hydrophilic group, and n denotes an integer of 1 or greater.

In the formula (I), $R^0$ functions as the hydrophobic group of a surfactant. The alkyl group denoted by $R^0$ is optionally substituted, may have a straight chain or branching chain, desirably has from 1 to 20 carbon atoms, preferably has from 4 to 16 carbon atoms, and more preferably has from 6 to 16 carbon atoms. Any of the substituents given as examples for substituent selected from the group D further below may be employed as substituents therein. The alkyl group having a terminal $CF_3$ group denoted by $R^0$ desirably has from 1 to 20 carbon atoms, preferably from 4 to 16 carbon atoms, and more preferably from 6 to 16 carbon atoms. The alkyl group having a terminal $CF_3$ group is an alkyl group in which part or all of the hydrogen atoms have been substituted with fluorine atoms. At least 50 percent of the hydrogen atoms in the alkyl group are desirably substituted with fluorine atoms, with at least 60 percent substitution being preferred and at least 80 percent substitution being of even greater preference. The remaining hydrogen atoms maybe further substituted with the substituents given as examples of substituent selected from the group D further below. The alkyl group having a terminal $CHF_2$ and not fewer than 8 carbon atoms denoted by $R^0$ desirably comprises from 8 to 20 carbon atoms, preferably from 8 to 16 carbon atoms. Some or all of the hydrogen atoms contained in the alkyl group are substituted with fluorine atoms. In the alkyl group having a terminal $CHF_2$ group and not fewer than 8 carbon atoms denoted by $R^0$, at least 50 percent of the hydrogen atoms in the alkyl group are desirably substituted with fluorine atoms, with 60 percent or more substitution being preferred and 80 percent or more substitution being of even greater preference. The remainder of the hydrogen atoms may be substituted with the substituents given as examples for substituent selected from the group D further below.

Examples are given below of the alkyl group having a terminal $CF_3$ group denoted by $R^0$ and the alkyl group having a terminal $CHF_2$ and having no fewer than 8 carbon atoms.

R1: n-$C_8F_{17}$—

R2: n-$C_6F_{13}$—

R3: n-$C_8F_{17}$—$(CH_2)_2$—

R4: n-$C_6F_{13}$—$(CH_2)_2$—

R5: n-$C_4F_9$—$(CH_2)_2$—

R6: H—$(CF_2)_8$—

R7: H—$(CF_2)_{12}$—

R8: H—$(CF_2)_8$—$(CH_2)_2$—

R9: H—$(CF_2)_{12}$—$(CH_2)_2$—

R10: $C_3F_7$—

In the formula (I) above, the linking group of valence (m+n) denoted by $L^0$ is desirably a combination of at least two groups selected from the group consisting of alkylene groups, alkenylene groups, (m+n) valence aromatic groups, bivalent heterocyclic residues, —CO—, —$NR^a$— (where $R^a$ denotes an alkyl group having from 1 to 5 carbon atoms or a hydrogen group), —O—, —S—, —SO—, and —$SO_2$—. Examples of $L^0$ are given below; it is connected on the left to $R^0$ and on the right to W. When possible, these linking groups may be substituted with the substituents selected from the group D further below.

L1

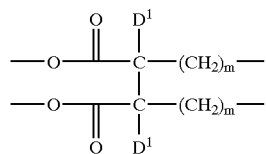

L2

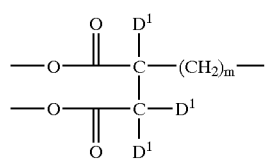

L3

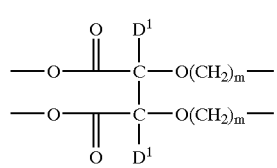

L4

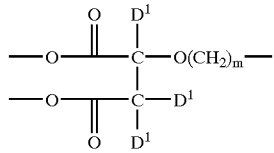

L5

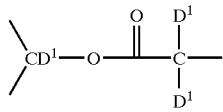

L6

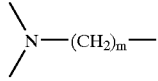

L7

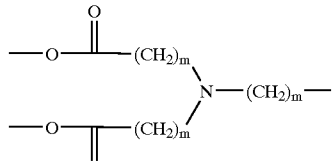

L8

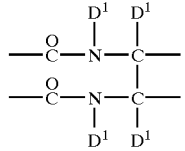

L9

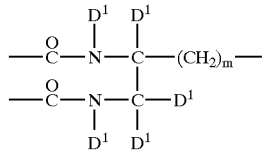

L10

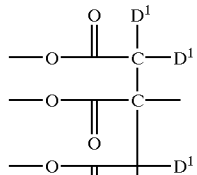

L11

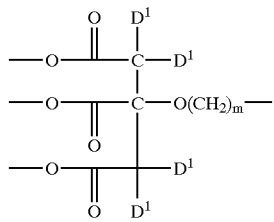

L12

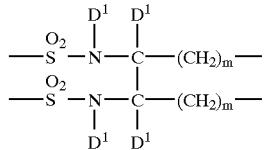

-continued

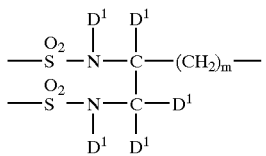
L13

In the formulae, $D^1$ denotes a hydrogen atom or a substituent selected from the group D described further below. Multiple occurrences of $D^1$ in the formula may be identical or different; m denotes an integer of from 0 to 20.

In formula (I), W denotes a hydrophilic group such as an anionic, cationic, and nonionic hydrophilic group. Examples of anionic groups denoted by W are all anionic groups with negative charges, with phosphoric acid groups, phosphonic acid groups, phosphinic acid groups, sulfuric acid groups, sulfonic acid groups, sulfinic acid groups, and carboxylic acid groups being desirable; phosphoric acid groups, phosphonic acid groups, sulfuric acid groups, sulfonic acid groups, and carboxylic acid groups being preferred; and sulfuric acid groups, sulfonic acid groups, and carboxylic acid groups being of even greater preference.

Examples of cationic groups denoted by W are all cationic groups with positive charges, with organic cationic substituents being desirable, and nitrogen and phosphorous cationic groups being preferred. Of greater preference are pyridium cations and ammonium cations, with trialkyl ammonium cations being of greatest preference.

Examples of nonionic groups denoted by W are mercapto groups, hydroxyl groups, optionally substituted amino groups, polyalcohols (for example, glycerin, glucose, sorbitol, and sucrose), amino alcohols (for example, $-N(C_2H_4OH)_2$), and polyethylene glycol (for example, $-(C_2H_4O)_nH$).

W is desirably an anionic hydrophilic group.

Of the compounds denoted by formula (I) above, the compounds denoted by formulas (II) to (IV) below are preferred.

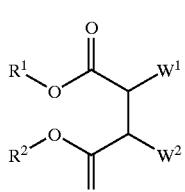
Formula (II)

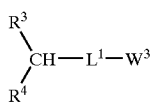
Formula (III)

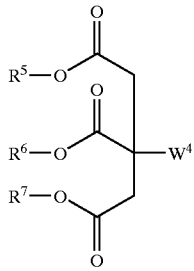
Formula (IV)

In the formulas, $R^1$, $R^2$, $R^3$, $R^4$, $R^5$, $R^6$, and $R^7$ each denote independent alkyl groups having terminal $CF_3$ groups. $L^1$ denotes a single bond or bivalent linking group. $W^1$ and $W^2$ each denote hydrogen atoms, hydrophilic groups, alkyl groups having hydrophilic groups, or alkoxy group having hydrophilic groups. However, $W^1$ and $W^2$ do not simultaneously denote hydrogen atoms. $W^3$ denotes a hydrophilic group or a hydrogen atom. $W^4$ denotes a hydrophilic group, alkyl group having a hydrophilic group, or alkoxy group having a hydrophilic group.

Formula (II) will be described first.

The alkyl groups having terminal $CF_3$ groups denoted by $R^1$ and $R^2$ are identically defined with the alkyl group having a terminal $CF_3$ group denoted by $R^0$ in formula (I) above, and their preferred scopes are identical.

$W^1$ and $W^2$ each denote hydrogen atoms, hydrophilic groups, alkyl groups having hydrophilic groups, or alkoxy groups having hydrophilic groups. However, $W^1$ and $W^2$ do not simultaneously denote hydrogen atoms. The hydrophilic groups denoted by $W^1$ and $W^2$ are identically defined with the hydrophilic groups denoted by W in formula (I) above, and their preferred scopes are identical. The alkyl groups having hydrophilic groups denoted by $W^1$ and $W^2$ may have straight or branching chains. They are desirably alkyl groups having from 1 to 20 carbon atoms, preferably alkyl groups having from 1 to 8 carbon atoms, and more preferably, alkyl groups having from 1 to 3 carbon atoms. The above-described alkyl groups having hydrophilic groups comprise at least one hydrophilic group. The hydrophilic group is identically defined with the hydrophilic group denoted by W in formula (I), and their preferred scopes are identical. The alkyl group having a hydrophilic group may be substituted with a substituent other than a hydrophilic group. Any of the substituents selected from the group D further below may be employed as this substituent group.

The alkoxy groups having hydrophilic groups denoted by $W^1$ and $W^2$ may have straight or branching chains. They are desirably alkoxy groups with from 1 to 20 carbon atoms, preferably alkoxy groups with from 1 to 8 carbon atoms, and more preferably alkoxy groups with from 1 to 4 carbon atoms. The alkoxy groups having hydrophilic groups comprise at least one hydrophilic group. These hydrophilic groups are identically defined with the hydrophilic groups denoted by W in formula (I) above, and their preferred scopes identical. The alkoxy groups having hydrophilic groups may be substituted with substituents other than hydrophilic substituents; any of the substituents selected from the group D further below may be employed as these substituents.

It is particularly desirable for $W^1$ and $W^2$ to denote hydrogen atoms or $(CH_2)_nSO_3M$ (where n denotes 0 or 1). M denotes a cation, but when the charge in the molecule is 0, M may be absent. Examples of desirable cations denoted by M are alkali metal ions (lithium ions, sodium ions, potassium ions, and the like), alkaline earth metal ions (barium ions, calcium ions, and the like), and ammonium ions.

Formula (III) will be described next.

In formula (III), $R^3$ and $R^4$ each denote alkyl groups having terminal $CF_3$ groups that are identically defined with the alkyl group having a terminal $CF_3$ group denoted by $R^0$ in formula (I); their preferred scopes are identical.

In formula (III), $L^1$ denotes a single bond or a bivalent linking group. $L^1$ desirably denotes a single bond or a linking group selected from the group consisting of alkylene groups, alkenylene groups, bivalent aromatic groups, bivalent heterocyclic residues, —CO—, —NR$^a$— (wherein R$^a$ denotes an alkyl group with from 1 to 5 carbon atoms or a hydrogen atom), —O—, —S—, —SO—, —SO$_2$—, and combinations of two or more thereof; and preferably denotes a single bond or a linking group selected from among the group consisting of alkylene groups with from 1 to 12 carbon atoms, aromatic groups with from 6 to 12 carbon atoms, —CO—, —NR$^a$—, —O—, —S—, —SO—, —SO$_2$—, and combinations of two or more thereof having a total number of carbon atoms of from 0 to 40. $L^1$ more preferably denotes a single bond or a linking group selected from the group consisting of alkyl groups with from 1 to 8 carbon atoms, —CO—, —NR$^a$—, —O—, —S—, —SO—, —SO$_2$—, and combinations of two or more thereof with a total number of carbon atoms of from 0 to 20. For example:

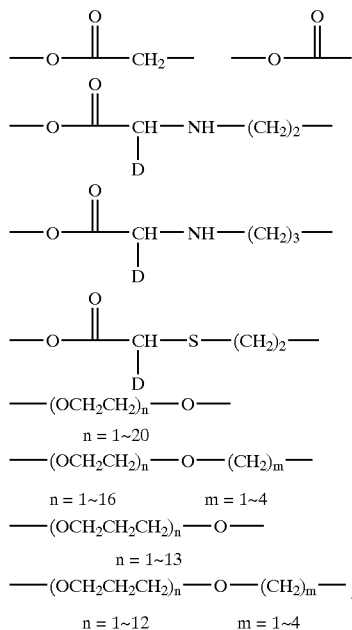

In the formulas, D denotes a substituent selected from the group D described further below.

In formula (III) above, the hydrophilic group denoted by $W^3$ is identically defined with the hydrophilic group denoted by W in formula (I) above, and their preferred scopes are identical.

Of the compounds denoted by formula (III) above, the compounds denoted by formula (IIIa) below are preferred.

Formula (IIIa)

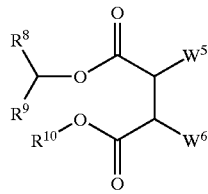

In formula (IIIa) above, $R^8$ and $R^9$ each independently denote an alkyl group having a terminal CF$_3$ group, $R^{10}$ denote an optionally substituted alkyl group, $W^5$ and $W^6$ each denote a hydrogen atom, hydrophilic group, alkyl group having a hydrophilic group, or alkoxy groups having a hydrophilic group, and $W^5$ and $W^6$ are not simultaneously hydrogen atoms. $W^5$ and $W^6$ preferably denote hydrogen atoms or (CH$_2$)$_n$SO$_3$M (where n denotes 0 or 1). M is defined identically with the M in formula (II) and their preferred scopes are identical.

In formula (IIIa) above, the optionally substituted alkyl group denoted by $R^{10}$ may be a straight chain or branching chain alkyl group. $R^{10}$ desirably denotes an optionally substituted alkyl group having from 1 to 40 carbon atoms, preferably a partially fluorine-substituted alkyl group having from 1 to 40 carbon atoms, and more preferably, a fluorine-substituted alkyl group having from 3 to 24 carbon atoms. For example:

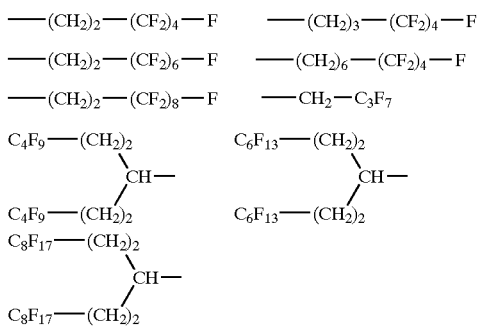

Formula (IV) above will be described next.

In formula (IV) above, the alkyl groups having terminal CF$_3$ groups denoted by $R^5$ and $R^6$ are identically defined with the alkyl group having a terminal CF$_3$ group denoted by $R^0$ in formula (I); their preferred scopes are identical.

In formula (IV) above, $W^4$ denotes a hydrophilic group, alkyl group having a hydrophilic group, or alkoxy group having a hydrophilic group. It is identically defined with $W^1$ and $W^2$ in formula (II); their preferred scopes are identical.

In the present Specification, substituent group D comprises alkyl groups (desirably alkyl groups having from 1 to 20 carbon atoms, preferably having from 1 to 12 carbon atoms, and more preferably having from 1 to 8 carbon atoms; examples are methyl, ethyl, isopropyl, tert-butyl, n-octyl, n-decyl, n-hexadecyl, cyclopropyl, cylopentyl, and cyclohexyl); alkenyl groups (desirably alkenyl groups having from 2 to 20 carbon atoms, preferably from 2 to 12 carbon atoms, and more preferably having from 2 to 8 carbon atoms; examples are vinyl, allyl, 2-butenyl, and 3-pentenyl); alkinyl groups (desirably alkinyl groups having from 2 to 20 carbon atoms, preferably from 2 to 12 carbon atoms, and more preferably from 2 to 8 carbon atoms; examples are propargyl and 3-pentinyl); aryl groups (desirably aryl groups having from 6 to 30 carbon atoms, preferably having from 6 to 20 carbon atoms, and more preferably having from 6 to 12 carbon atoms; examples are phenyl, p-methylphenyl, and naphthyl); optionally substituted amino groups (desirably amino groups having from 0 to 20 carbon atoms, preferably having from 0 to 10 carbon atoms, and more preferably having from 0 to 6 carbon atoms; examples are unsubstituted amino, methylamino, dimethylamino, diethylamino and dibenzylamino); alkoxy groups (desirably alkoxy groups having from 1 to 20 carbon atoms, preferably having from 1 to 12 carbon atoms, and more preferably having from 1 to 8 carbon atoms; examples are methoxy, ethoxy, and butoxy); aryloxy groups (desirably aryloxy groups having from 6 to 20 carbon atoms, preferably having from 6 to 16 carbon atoms, and more preferably having from 6 to 12 carbon atoms; examples are phenyloxy and 2-naphthyloxy), acyl groups (desirably acyl groups having from 1 to 20 carbon atoms, preferably having from 1 to 16 carbon atoms, and more preferably having from 1 to 12 carbon atoms; examples are acetyl, benzoyl, formyl, and pivaloyl); alkoxycarbonyl groups (desirably alkoxycarbonyl groups having from 2 to 20 carbon atoms, preferably having from 2 to 16 carbon atoms, and more preferably having from 2 to 12 carbon atoms; examples are methoxycarbonyl and ethoxy carbonyl); aryloxycarbonyl groups (desirably aryloxycarbonyl groups having from 7 to 20 carbon atoms, preferably having from 7 to 16 carbon atoms, and more preferably having from 7 to 10 carbon atoms; examples include phenyloxycarbonyl); acyloxy groups (desirably acyloxy groups having from 2 to 20 carbon atoms, preferably having from 2 to 16 carbon atoms, and more preferably having from 2 to 10 carbon atoms; examples are acetoxy and benzoyloxy); acylamino groups (desirably acylamino groups having from 2 to 20 carbon atoms, preferably having from 2 to 16 carbon atoms, and more preferably having from 2 to 10 carbon atoms; examples are acetylamino and benzoylamino); alkoxycarbonylamino groups (desirably alkoxycarbonylamino groups having from 2 to 20 carbon atoms, preferably having from 2 to 16 carbon atoms, and more preferably having from 2 to 12 carbon atoms; examples include methoxycarbonylamino); aryloxycarbonylamino groups (desirably aryloxycarbonylamino groups having from 7 to 20 carbon atoms, preferably having from 7 to 16 carbon atoms, and more preferably having from 7 to 12 carbon atoms; examples include phenyloxycarbonylamino); sulfonylamino groups (desirably sulfonylamino groups having from 1 to 20 carbon atoms, preferably having from 1 to 16 carbon atoms, and more preferably having from 1 to 12 carbon atoms; examples are methanesulfonylamino and benzenesulfonylamino), sulfamoyl groups (preferably sulfamoyl groups having from 0 to 20 carbon atoms, preferably having from 0 to 16 carbon atoms, and more preferably having from 0 to 12 carbon atoms; examples are sulfamoyl, methylsulfamoyl, dimethylsulfamoyl and phenylsulfamoyl); carbamoyl groups (desirably carbamoyl groups having from 1 to 20 carbon atoms, preferably having from 1 to 16 carbon atoms, and more preferably having from 1 to 12 carbon atoms; examples are unsubstituted carbamoyl, methylcarbamoyl, diethylcarbamoyl and phenylcarbamoyl); alkylthio groups (desirably alkylthio groups having from 1 to 20 carbon atoms, preferably having from 1 to 16 carbon atoms, and more preferably having from 1 to 12 carbon atoms; examples are methylthio and ethylthio), arylthio groups (desirably arylthio groups having from 6 to 20 carbon atoms, preferably having from 6 to 16 carbon atoms, and more preferably having from 6 to 12 carbon atoms; examples include phenylthio); sulfonyl groups (desirably sulfonyl groups having from 1 to 20 carbon atoms, preferably having from 1 to 16 carbon atoms, and more preferably having from 1 to 12 carbon atoms; examples are mesyl and tosyl); sulfinyl groups (desirably sulfinyl groups having from 1 to 20 carbon atoms, preferably having from 1 to 16 carbon atoms, and more preferably having from 1 to 12 carbon atoms; examples are methanesulfinyl and benzenesulfinyl); ureido groups (desirably ureido groups having from 1 to 20 carbon atoms, preferably having from 1 to 16 carbon atoms, and more preferably having from 1 to 12 carbon atoms; examples are unsubstituted ureido, methylureido and phenylureido); phosphoramide groups (desirably phosphoramide groups having from 1 to 20 carbon atoms, preferably having from 1 to 16 carbon atoms, and more preferably having from 1 to 12 carbon atoms; examples are diethyl phosphoramide and phenyl phosphoramide); hydroxy, mercapto, halogen atoms (for example, fluorine, chlorine, bromine and iodine); cyano, sulfo, carboxyl, nitro, hydroxamic acid groups, sulfino, hydrazino, imino, heterocyclic groups (desirably heterocyclic groups having from 1 to 30 carbon atoms, preferably having from 1 to 12 carbon atoms; examples are heterocyclic groups having hetero atoms such as nitrogen, oxygen, and sulfur; examples are imidazolyl, pyridyl, quinolyl, furyl, piperidyl, morpholino, benzooxazolyl, benzimidazolyl, and benzthioazolyl); and silyl groups (desirably silyl groups having from 3 to 40 carbon atoms, preferably having from 3 to 30 carbon atoms, and more preferably having from 3 to 24 carbon atoms; examples are trimethylsilyl and triphenylsilyl). These substituents may be further substituted with these substituents. Further, when there are two or more substituents, they may be identical or different. When possible, they may be bonded together to form a ring.

Specific examples of compounds denoted by formula (I) are given below. However, compounds that can be employed in the present invention are not limited to these compounds. Among the specific examples below, Nos. I-17 to 44, 49, 51, 52, and 55 to 68 are examples of compounds denoted by formula (II); Nos. I-69 to 89 are examples of compounds denoted by formula (III); and Nos. I-90 to 105 are examples of compounds denoted by formula IV.

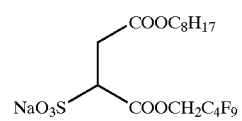

I-1

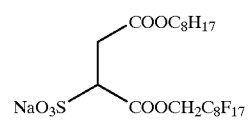

I-2

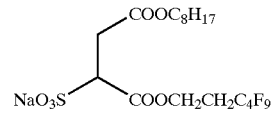

I-3

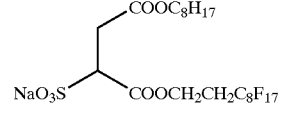

I-4

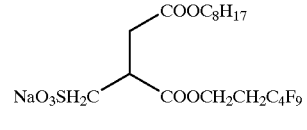

I-5

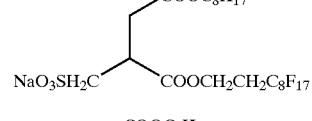

I-6

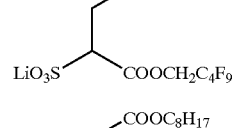

I-7

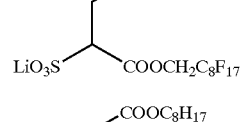

I-8

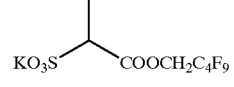

I-9

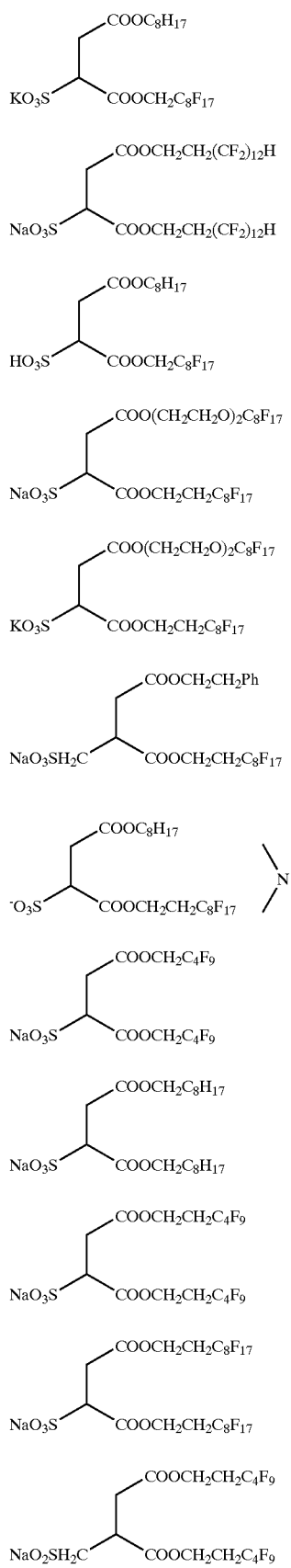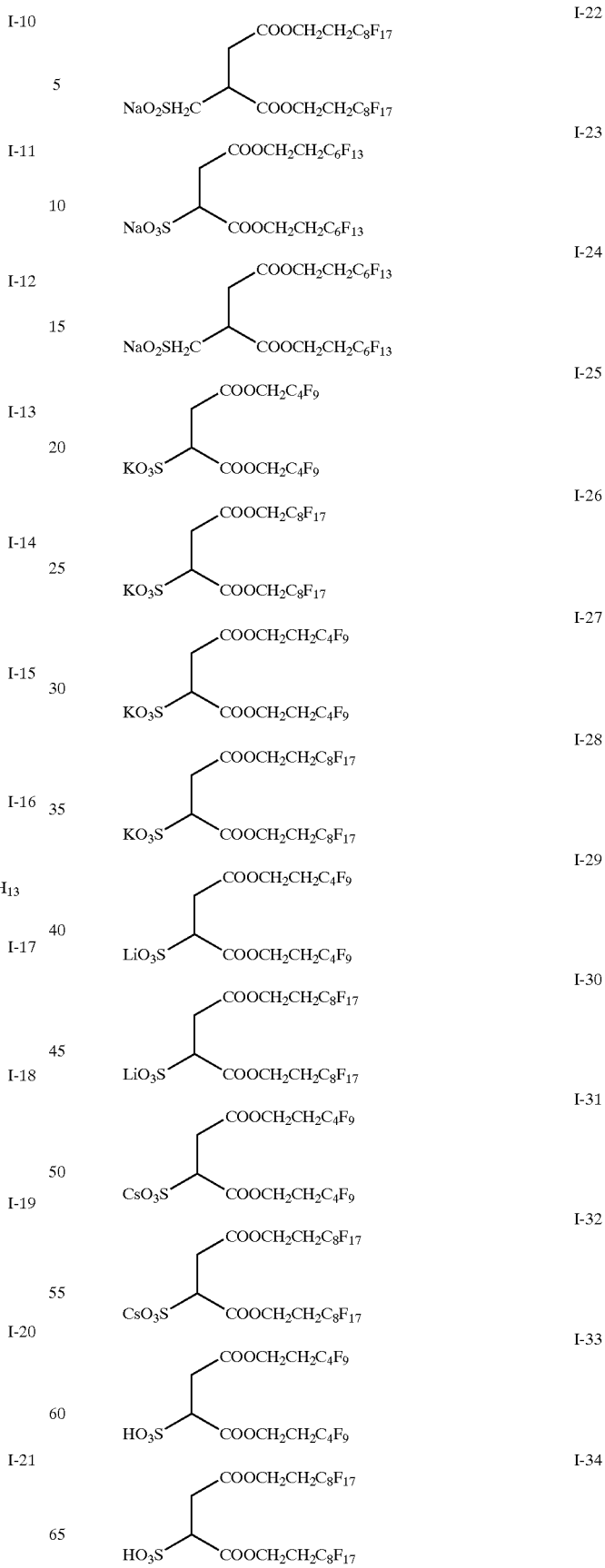

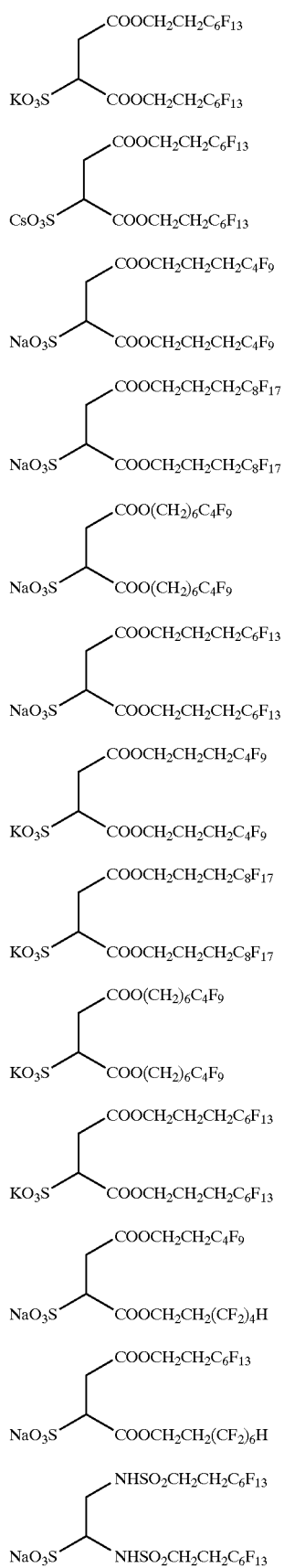
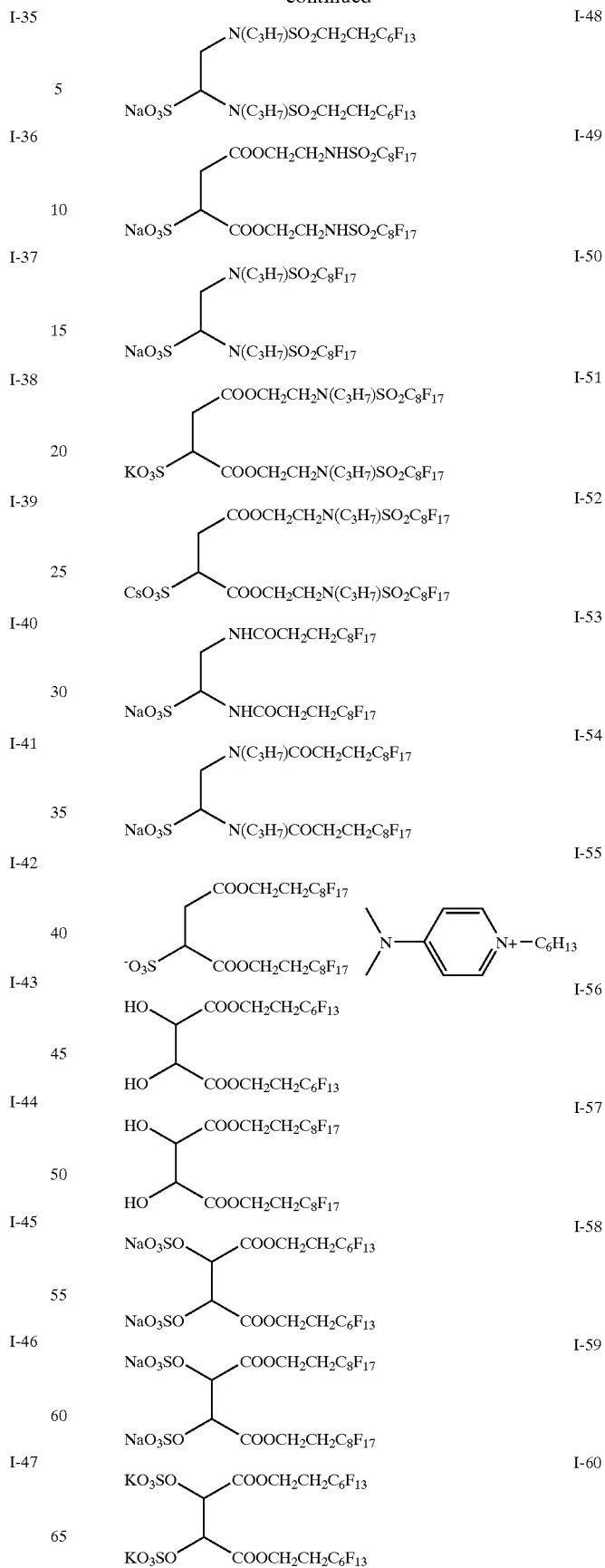

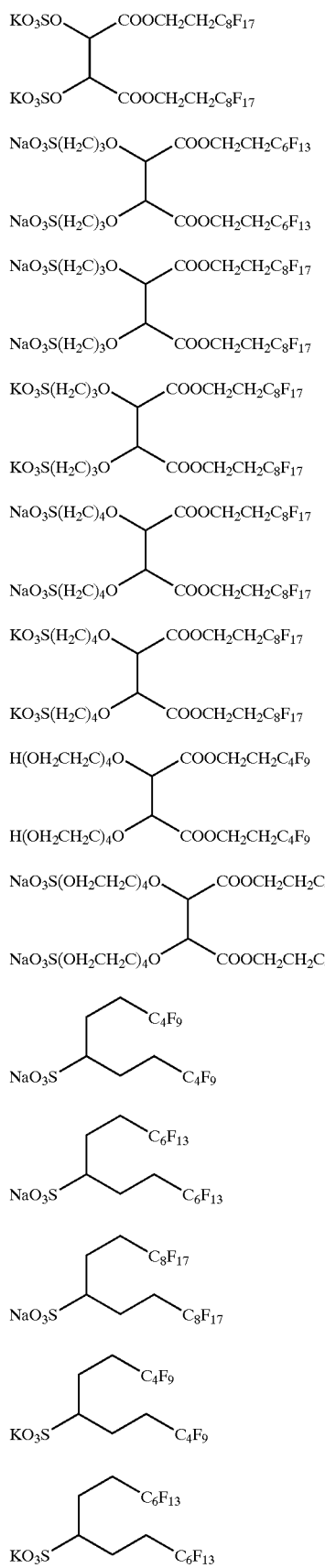
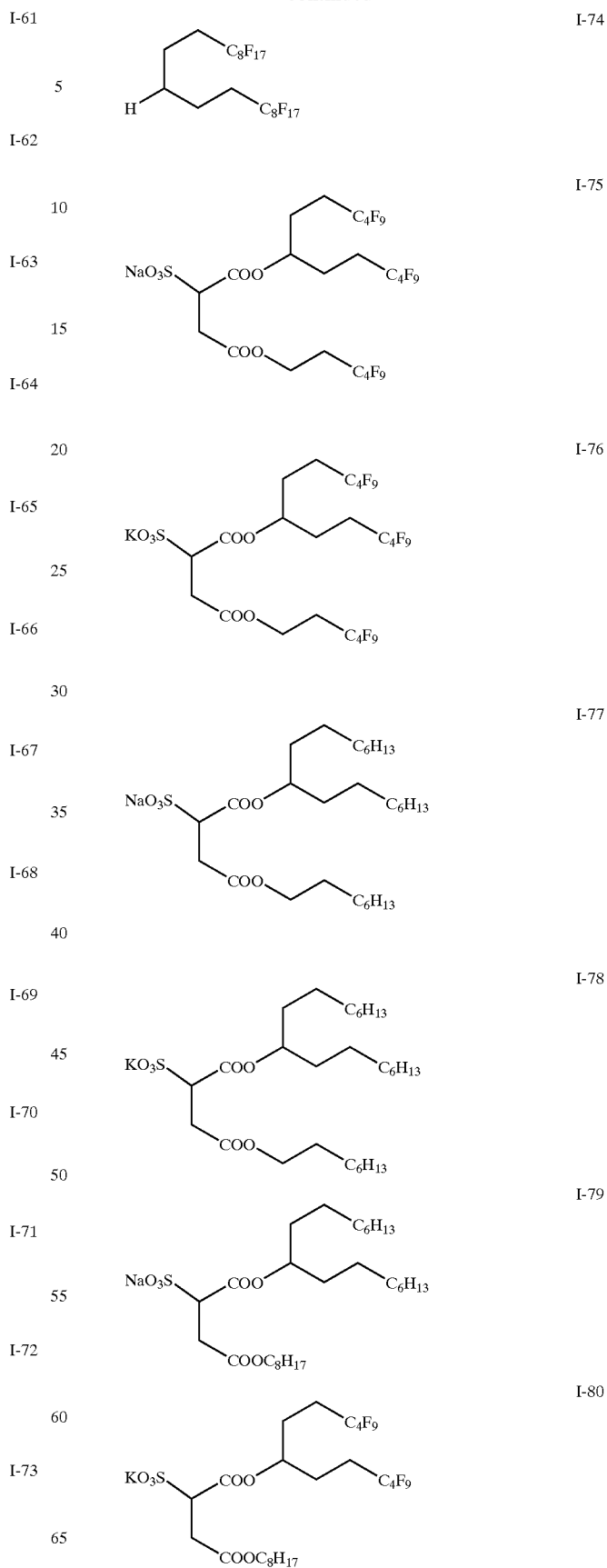

I-81 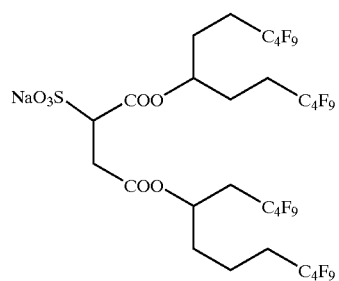
I-82 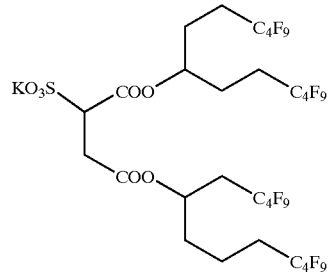
I-83 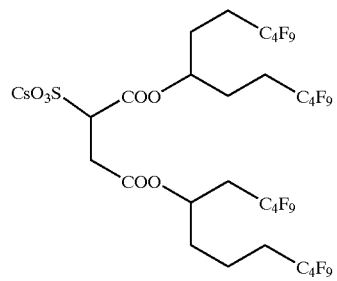
I-84 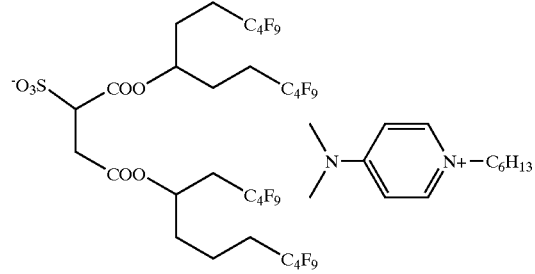
I-85 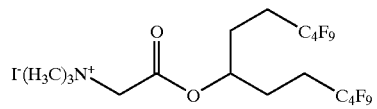
I-86 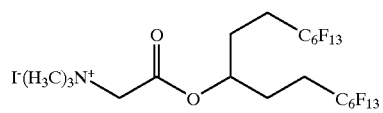
I-87 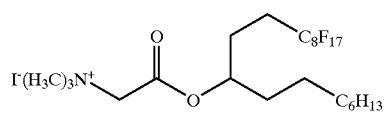
I-88 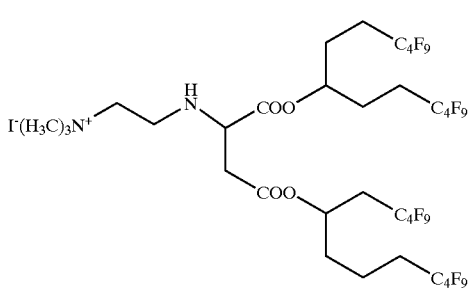
I-89 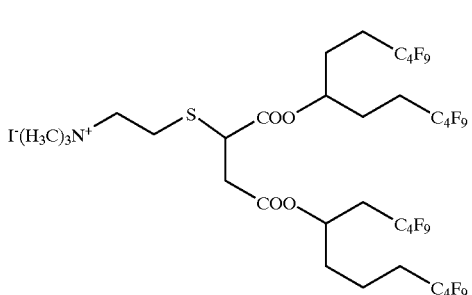
I-90 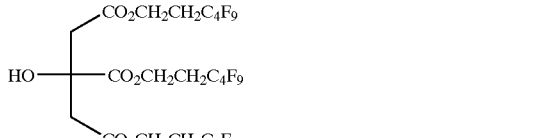
I-91 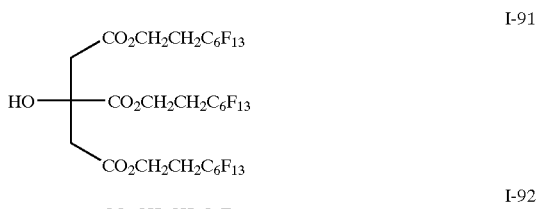
I-92 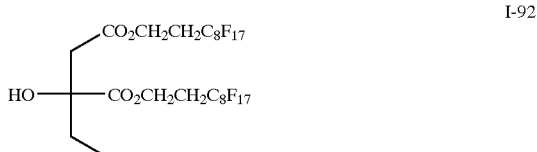
I-93 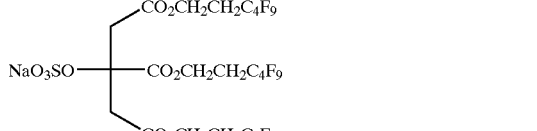
I-94 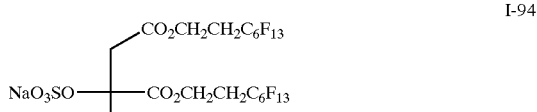
I-95 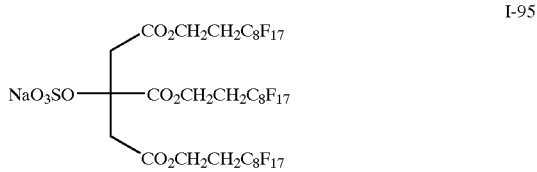

I-96 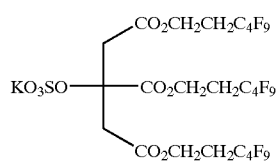
I-97 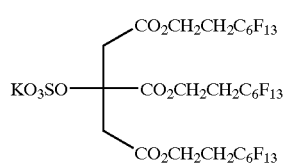
I-98 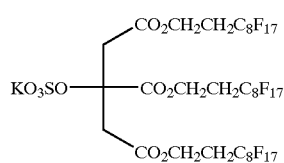
I-99 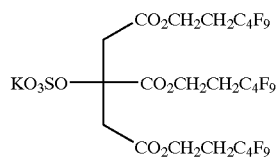
I-100 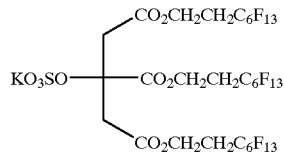
I-101 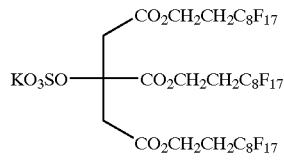
I-102 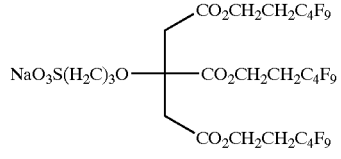
I-103 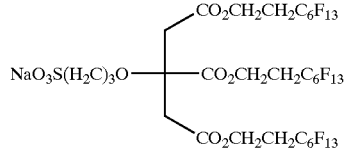
I-104 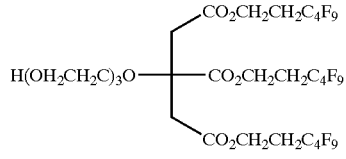
I-105 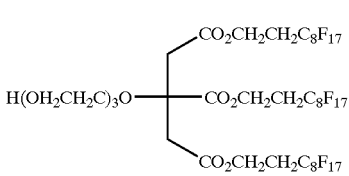
I-106 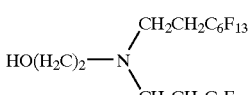
I-107 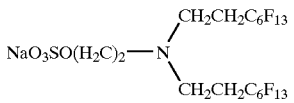
I-108 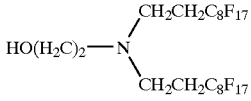
I-109 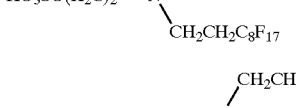
I-110 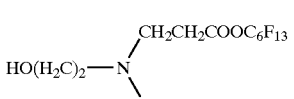
I-111 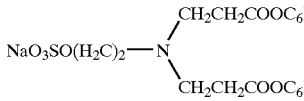
I-112 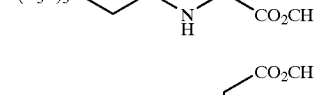
I-113 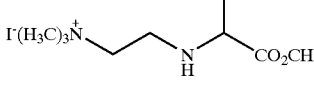
I-114 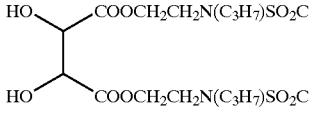
I-115 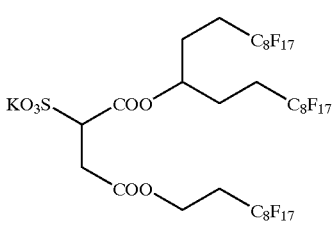
I-116

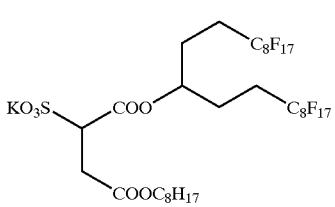

I-117

The compounds denoted by formula (I) above can be readily synthesized by combining common esterification and sulfonation reactions.

The compounds denoted by formula (I) above may be employed singly or in combinations of two or more. They may also be employed in combination with fluorine compounds in addition to the compounds denoted by formula (I). The fluorine compounds that are employed in combination are desirably the fluorine-containing surfactants described in JP-A No. hei 11-35238 and No. 2001-330725.

The optical compensatory sheet of the present invention can be produced by forming an optically anisotropic layer of a discotic liquid-crystal composition (coating liquid) comprising a discotic liquid-crystal compound and the compound denoted by formula (I) above. Other components such as the polymerization initiators described further below and optional additives (for example, plasticizers, monomers, surfactants, cellulose esters, 1,3,5-triazine compounds, and chiral agents) may be added to the discotic liquid-crystal composition. An organic solvent is desirably employed in the preparation of the discotic liquid-crystal composition. Examples of organic solvents are amides (for example, N,N-dimethylformamide), sulfoxides (for example, dimethylsulfoxide), heterocyclic compounds (for example, pyridine), hydrocarbons (for example, benzene and hexane), alkylhalides (for examples, chloroform and dichloromethane), esters (for example, methyl acetate and butyl acetate), ketones (for example, acetone and methyl ethyl ketone), and ethers (for example, tetrahydrofuran and 1,2-dimethoxyethane). Alkyl halides and ketones are preferred. Two or more organic solvents may also be employed in combination.

The optically anisotropic layer can be formed by coating the above discotic liquid-crystal composition on a transparent support. An alignment layer is desirably formed on the transparent support, and the discotic liquid-crystal composition is then desirably coated over the alignment layer. Further, the optically anisotropic layer may be formed on a temporary support and then transferred to the transparent support.

The method of applying the discotic liquid-crystal composition is not specifically limited. Various known methods (such as wafer bar coating, pressure coating, direct gravure coating, reverse gravure coating, and die coating) may be employed.

In the optically anisotropic layer, the discotic liquid-crystal molecules are desirably essentially uniformly aligned. It is further desirable to secure them in an essentially uniformly aligned state. The liquid-crystal molecules are desirably secured by polymerization reaction. Polymerization reactions include thermal polymerization reactions employing a thermal polymerization initiator and photo-polymerization reactions employing an photo-polymerization initiator. A photo-polymerization reaction is preferred. Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of tri-arylimidazole dimers and p-aminophenyl ketones (described in U.S. Pat. No. 3,549,367), acridine and phenadine compounds (described in JP-A No. sho 60-105667 and U.S. Pat. No. 4,239,850), and oxadiazole compounds (described in U.S. Pat. No. 4,212,970). The quantity of photo-polymerization initiator employed is desirably from 0.01 to 20 weight percent, preferably from 0.5 to 5 weight percent, of the solid portion of the coating liquid. Irradiation for polymerization of discotic liquid-crystal molecules is desirably conducted with ultraviolet radiation. The irradiation energy is desirably from 20 mJ/cm$^2$ to 50 J/cm$^2$, preferably from 100 to 800 mJ/cm$^2$. Irradiation may be conducted under heated conditions to promote the photo-polymerization reaction. The thickness of the optically anisotropic layer is desirably from 0.1 to 20 micrometers, preferably from 0.5 to 15 micrometers, and more preferably from 1 to 10 micrometers.

The transparent support employed in the present invention is desirably an optically isotropic polymer film. Stating that the support is "transparent" means that light transmittance is greater than or equal to 80 percent. Specifically, to achieve optical isotropy, in-plane retardation (Re) is desirably less than or equal to 10 nm, preferably less than or equal to 5 nm. Retardation in the direction of thickness (Rth) is desirably less than or equal to 40 nm, preferably less than or equal to 20 nm. In-plane retardation (Re) and retardation in the direction of thickness (Rth) of the transparent support are defined by the following equations:

$Re=(nx-ny) \times d$ $Rth=\{(nx+ny)/2-nz\} \times d$

In the equations, nx and ny denote the in-plane refractive indexes of the transparent support, nz denotes the refractive index of the transparent support in the direction of thickness, and d denotes the thickness of the transparent support.

For some liquid-crystal mode, optically anisotropic polymer films may be employed as transparent supports. That is, the optical anisotropy caused by the transparent support is sometimes added to the optical anisotropy caused by the optically anisotropic layer to take care of (optically compensate for) the optical anisotropy caused by the liquid-crystal cells. When an optically anisotropic transparent support is employed to the optical compensatory sheet according to the present invention, the in-plane retardation (Re) of the transparent support is desirably greater than or equal to 20 nm, preferably greater than or equal to 30 nm. Further, the retardation in the direction of thickness (Rth) is desirably greater than or equal to 80 nm, preferably greater than or equal to 120 nm.

The material used to form the transparent support is determined based on whether an optically isotropic support or an optically anisotropic support is being employed. For an optically isotropic support, glass or cellulose ester is generally employed. For an optically anisotropic support, synthetic polymer (for example, polycarbonate, polysulfone, polyethersulfone, polyacrylate, polymethacrylate, or norbornene resin) is generally employed. Stretching the synthetic polymer film achieves optical anisotropy. However, cellulose ester films with high retardation (optical anisotropy) can be produced by (1) the use of a retardation increasing agent, (2) decreasing the degree of acetation of cellulose acetate, and (3) producing films by the cold melt method described in European Patent No. 0911656A2.

Cellulose ester and synthetic polymer films are desirably manufactured by the solvent casting method. The thickness of the transparent support is desirably from 20 to 500 micrometers, preferably from 50 to 200 micrometers. The transparent support maybe surface treated (for example, by glow discharge treatment, corona discharge treatment, UV treatment, or flame treatment) to improve adhesion between the transparent support and layers (adhesive layers, alignment layers, and optically anisotropic layers) provided over it. An adhesive layer (undercoating layer) may also be provided over the transparent support.

As set forth above, it is desirable to form an alignment layer on the transparent support and align the discotic liquid-crystal molecules on the alignment layer. The alignment layer may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known. Alignment layers formed by rubbing polymer layers are particularly desirable. In the rubbing treatment, the surface of a polymer layer is rubbed several times in a constant direction with paper or cloth. The type of polymer employed in the alignment layer is described in the literature for optical compensatory sheets employing discotic liquid-crystal molecules corresponding to the various display modes described above. The thickness of the alignment layer is desirably from 0.01 to 5 micrometers, preferably from 0.05 to 1 micrometer. An alignment layer may be first used to align the discotic liquid-crystal molecules in an optically anisotropic layer, and the optically anisotropic film then transferred onto a transparent support. Discotic liquid-crystal molecules that have been fixed in an aligned state can be maintained in an aligned state without an alignment layer.

The optical compensatory sheet of the present invention may be combined with a polarizing film and employed as an elliptical polarizing plate. It may also be combined with a polarizing film and used to broaden the viewing angle in a transmitting liquid-crystal display.

Elliptical polarizing plates and liquid-crystal devices employing the optical compensatory sheet of the present invention are described below.

[Elliptical Polarizing Plates]

The optical compensatory sheet of the present invention may be laminated with a polarizing film to produce an elliptical polarizing plate. The use of the optical compensatory sheet of the present invention provides an elliptical polarizing plate capable of broadening the viewing angle of a liquid-crystal display.

The polarizing film may be an iodine-based polarizing film, dye-based polarizing film employing a dichroic dye, or a polyene-based polarizing film. Iodine-based polarizing films and dye-based polarizing films can generally be formed of polyvinyl alcohol-based films. The polarizing axis of the polarizing film corresponds to a direction normal to the direction of orientation of the film.

The polarizing film is deposited on the optically anisotropic layer side of the above-described optical compensatory sheet. A transparent protective film is desirably formed on the side opposite the side of the optical compensatory sheet on which the polarizing film has been deposited. The transparent protective film desirably has optical transmittance of greater than or equal to 80 percent. Generally, a cellulose ester film, preferably a triacetyl cellulose film, is employed as the transparent protective film. The cellulose ester film is desirably formed by the solvent casting method. The transparent protective film is desirably 20 to 500 micrometers, preferably 50 to 200 micrometers, in thickness.

[The Liquid-Crystal Display]

The use of an optical compensatory sheet in the present invention makes it possible to provide a liquid-crystal display with a broadened viewing field.

The optical compensatory sheet of the present invention may be combined with liquid-crystal cells driven by various modes such as TN (Twisted Nematic), IPS (In-Plane Switching), FLC (Ferroelectric Liquid Crystal), OCB (Optically Compensatory Bend), STN (Supper Twisted Nematic), VA (Vertically Aligned), and HAN (Hybrid Aligned Nematic) modes; and employed in various liquid-crystal displays. The optical compensatory sheet of the present invention is particularly effective in twisted nematic (TN) mode liquid-crystal displays.

One implementation mode of a liquid-crystal display employing the optical compensatory sheet of the present invention is a transmitting liquid-crystal display comprised of two polarizing plates positioned on either side of a TN mode liquid-crystal cell, with the optical compensatory sheet of the present invention positioned between the polarizing plate on at least one side and the liquid-crystal cell. Another implementation mode is in the form of a transmitting liquid-crystal display comprised of two polarizing plates positioned on either side of a TN mode liquid-crystal cell, with at least one of the polarizing plates being in the form of one of the above-described elliptical polarizing plates obtained by sequentially laminating an optically anisotropic layer of discotic liquid-crystal molecules, a transparent support, a polarizing film, and a transparent protective film.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example 1

(Measurement of an Air Interface Polarity of an Optically Anisotropic Layer)

2 g of a polymer shown bellow was dissolved in mixed solvent of 36 g of pure water and 12 g of methyl alcohol, and the solution was applied to a transparent glass substrate. After drying at 100° C. for 2 minutes to form a layer, an alignment layer was formed by rubbing treatment of the layer with tucked in by 0.2 µm. The thickness of the alignment layer was 0.5 µm.

Polymer for production of an alignment layer

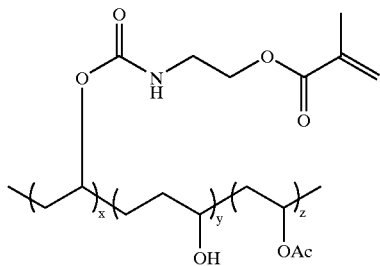

The polymerization degree of the polymer was 300 and the molar ration x:y:z was 1.7:86.3:12.

The alignment layer was cut into the dimension of 2 cm×2.5 cm and the coating liquid containing following components was applied to the alignment layer by spin coating method with 2000 rpm. An optically anisotropic layer having a thickness of 1.5 µm was formed on the alignment layer.

| Coating liquid of optically anisotropic layer | |
|---|---|
| Discotic liquid-crystal compound described below | 90 weight parts |
| Ethylene oxide-modified trimethylolpropane triacrylate (V#360 made by Osaka Organic Chemicals (Ltd.)) | 10 weight parts |
| Photopolymerization initiator described below | 3 weight parts |
| Compound No. I-19 | 0.1 weight part |
| Methyl ethyl ketone | 295.5 weight part |

Discotic liquid-crystal compound

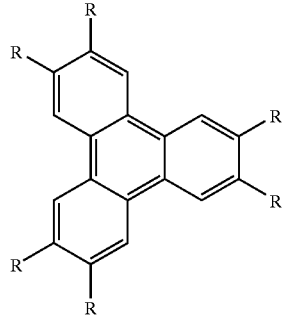

R; 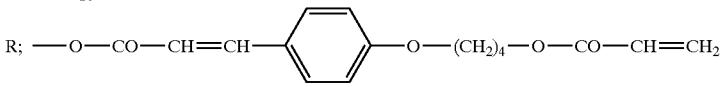

Photopolymerization initiator

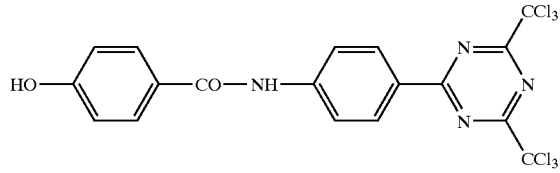

The coated layer was heated for 3 min in a thermostatic chamber at 125° C. and the discotic liquid-crystal compound was aligned. Subsequently, a 120 W/cm high-pressure mercury lamp was used to irradiate the coated layer for 1 min with UV radiation, causing the discotic liquid-crystal compound to polymerize and thus fixing it in an aligned state. The discotic liquid crystal compound was heated at 125° C. in a constant temperature bath for 3 minutes and aligned. The optically anisotropic layer was produced.

After the sample was left for an hour under an atmosphere in which the temperature and the humidity were respectively controlled at 25° C. and 60% RH, the contact angles of pure water and methylene iodide on the optically anisotropic layer were measured and a surface free energy ($\gamma_s$), a dispersion force component ($\gamma_s^d$) and a polar force component ($\gamma_s^p$) of the optically anisotropic layer were determined based on the measurement values. The contact angles were measured using a contact angle meter (CA-A model provided by KYOWA INTERERFACE SCIENCE CO., LTD). The results are shown in Table 1.

Examples 2 to 5, 1' and 2'

Various optically anisotropic layers were formed in the same manner as the example 1, except that various compounds represented by the formula (I) shown in Table 1 were respectively used with the same mixed ration and the amount in place of Compound No. 19. The air interface polarities of the formed optically anisotropic layers were measured in the same manner as the example 1. The results are shown in Table 1.

TABLE 1

| Example No. | Air interface control agent | Contact Angle (deg) water | Contact Angle (deg) methylene iodide | Surface Free Energy (mN/m) $\gamma_s^d$ | Surface Free Energy (mN/m) $\gamma_s^p$ | Surface Free Energy (mN/m) $\gamma$ | Polarity $\gamma_s^p/\gamma_s^d$ | $P_{add}/P_{non-add}$* |
|---|---|---|---|---|---|---|---|---|
| 1 | No.I-19 | 29.5 | 21.2 | 31.6 | 16.4 | 48.0 | 0.52 | 1.57 |
| 2 | No.I-20 | 25.8 | 30.8 | 11.1 | 43.0 | 54.1 | 3.87 | 11.70 |
| 3 | No.I-21 | 28.7 | 33.3 | 17.8 | 25.8 | 43.7 | 1.44 | 4.36 |
| 4 | No.I-23 | 21.3 | 36.0 | 13.6 | 41.5 | 55.1 | 3.05 | 9.24 |
| 5 | No.I-81 | 24.7 | 34.2 | 16.0 | 33.6 | 49.6 | 2.10 | 6.36 |
| 1' | Compound(A) | 30.5 | 15.0 | 38.0 | 12.5 | 50.5 | 0.33 | 1.00 |
| 2' | non | 30.5 | 15.0 | 38.0 | 12.5 | 50.5 | 0.33 | — |

*$P_{add}$ means a polarity of the optically anisotropic layer added the agent.
*$P_{non-add}$ means a polarity of an optically anisotropic layer not added the agent.

Compound (A) for the example 1' is shown bellow;

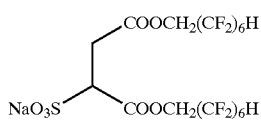

which was disclosed in JP-A 2001-330725 as FS-92.

Example 6

(Preparation of the Transparent Support)

The following components were charged to a mixing tank and stirred with heating to prepare a cellulose acetate solution (dope).

| Composition of cellulose acetate solution composition | |
|---|---|
| Cellulose acetate with a 60.9 percent degree of acetation | 100 weight parts |
| Triphenyl phosphate | 6.5 weight parts |
| Biphenyldiphenyl phosphate | 5.2 weight parts |
| Retardation enhancer (1) described below | 0.1 weight part |
| Retardation enhancer (2) described below | 0.2 weight part |
| Methylene chloride | 310.25 weight parts |
| Methanol | 54.75 weight parts |
| 1-Butanol | 10.95 weight parts |

Retardation enhancer (1)

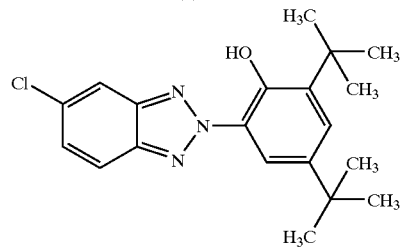

Retardation enhancer (2)

| Composition of cellulose acetate solution composition |
|---|

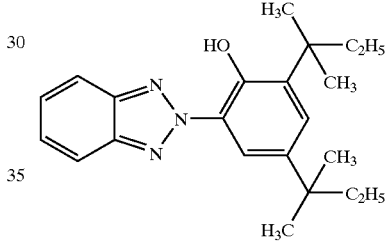

The dope obtained was made to flow out of a nozzle onto a drum cooled to 0° C. It was peeled off while having a solvent content of 70 weight percent, the two edges of the film in the transverse direction were fixed with a pin tenter, and in the area where the solvent content was from 3 to 5 weight percent, the film was dried while maintaining a spacing yielding a stretching rate of 3 percent in the traverse direction (direction perpendicular to the machine direction). Subsequently, the film was further dried by passing it between the rolls of a heat treatment device and adjusted to achieve a ratio between the stretching rate in the transverse direction and the stretching rate in the machine direction of 0.75 with an essentially 0 percent stretching rate in the machine direction in the area in which the glass transition temperature exceeded 120° C. (taking into account 4 percent stretching in the machine direction during separation). This yielded a cellulose acetate film 100 micrometers thick. Measurement of the retardation of the film thus prepared at a wavelength of 632.8 nm revealed a thickness retardation of 40 nm and an in-plane retardation of 4 nm. The cellulose acetate film thus prepared was employed as transparent support.

(Formation of a First Undercoating Layer)

A coating liquid of the composition indicated below was applied to 28 ml/m² on the transparent support and dried to form a first undercoating layer.

Composition of first undercoating layer coating liquid

| | |
|---|---|
| Gelatin | 5.42 weight parts |
| Formaldehyde | 1.36 weight parts |
| Salicylic acid | 1.60 weight parts |
| Acetone | 391 weight parts |
| Methanol | 158 weight parts |
| Methylene chloride | 406 weight parts |
| Water | 12 weight parts |

(Formation of Second Undercoating Layer)

A coating liquid of the composition indicated below was applied to 7 ml/m² on the first undercoating layer and dried to form a second undercoating layer.

| Composition of second undercoating layer coating liquid | |
|---|---|
| Anionic polymer described below | 0.79 weight part |
| Citric acid monoethyl ester | 10.1 weight parts |
| Acetone | 200 weight parts |
| Methanol | 877 weight parts |
| Water | 40.5 weight parts |

Anionic polymer

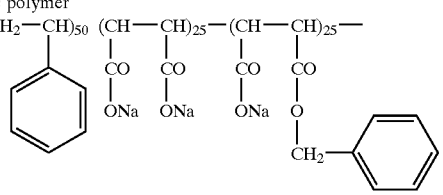

(Formation of Back Layer)

A coating liquid of the composition indicated below was applied to 25 ml/m² on the surface of the opposite side of the transparent support and dried to form a back layer.

Composition of back layer coating liquid

| | |
|---|---|
| Cellulose diacetate with 55 percent degree of acetation | 6.56 weight parts |
| Silica-based matting agent (average particle size: 1 micrometer) | 0.65 weight parts |
| Acetone | 679 weight parts |
| Methanol | 104 weight parts |

(Formation of Alignment Layer)

An aqueous solution of long-chain-alkyl-modified polyvinyl alcohol was applied on the second undercoating layer and dried for 90 sec with 60° C. hot air, after which a rubbing treatment was applied to form an alignment layer. The rubbing direction of the alignment layer was parallel to the flow direction of the transparent support.

(Formation of Optically Anisotropic Layer)

The coating solution used for preparation of the optically anisotropic layer of Sample 1 was applied with a #4 wire bar to the alignment layer. The quantity of fluorine compound applied was 1.8 mg/m².

The coated layer was heated for 3 min in a thermostatic chamber at 130° C. and the discotic liquid-crystal compound was oriented. Subsequently, a 120 W/cm high-pressure mercury lamp was used to irradiate the coated layer for 1 min with UV radiation, causing the discotic liquid-crystal compound to polymerize and thus fixing it in an oriented state. The liquid-crystal compound was cooled to room temperature to complete preparation of the optical compensatory sheet.

The mean tilt angle ($\beta$) of the optical compensatory sheet was measured. The result was shown in Table 2. Hereafter in the specification, $\beta$ is calculated by using a refractive index ellipsoid model as conventional approximation.

(Preparation of Liquid-Crystal Display)

A polyimide alignment layer was provided on a glass substrate equipped with transparent ITO electrodes and treated by rubbing. Five micrometer spacers were positioned and two such sheets of substrate were positioned with their alignment layers facing. The two substrates were positioned so that the rubbing directions of their alignment layers were perpendicular. Rod-shaped liquid-crystal molecules (ZL4792 made by Merck Co.) were poured into the gap between the substrates to form a rod-shaped liquid-crystal layer. The $\Delta n$ of the rod-shaped liquid-crystal molecules was 0.0969. Two optical compensatory sheets prepared as set forth above were bonded to either side of the TN liquid-crystal cell prepared as set forth above so that the optically anisotropic surfaces faced the substrates of the liquid-crystal cell. Two polarizing plates were then bonded to the outside thereof to prepare a liquid crystal display. The arrangement was such that the rubbing direction of the alignment layer of the optical compensatory sheet was antiparallel to the rubbing direction of the alignment layer of the liquid-crystal cell adjacent thereto. Further, the arrangement was such that the absorption axis of the polarizing plate was parallel to the rubbing direction of the liquid-crystal cell. A voltage was applied to the liquid-crystal cell of the liquid-crystal display, the transmittance of a 2 V white display and a 5 V black display was adopted as the contrast ratio, a contrast ratio of 10 was measured vertically and horizontally, and the area without gradation reversal was measured as the viewing angle. The results are given in Table 2.

Examples 7 to 10, 3' and 4'

With the exception that Compound No. I-19 in the example 6 was replaced with the compounds of the present invention indicated in Table 2 (without change in the mixing ratio or quantity employed), optical compensatory sheets and a liquid-crystal display were prepared in the same manner as in the example 6. The mean tilt angles and viewing angles of the displays were measured in the same manner as the example 6. The results are given in Table 2.

TABLE 2

| | | | Viewing angle | |
|---|---|---|---|---|
| Example No. | Air interface control agent | Mean tilt angle $\beta$ | Vertical direction | Horizontal direction |
| 6 | No.I-19 | 23° | 85° | 135° |
| 7 | No.I-20 | 27° | 91° | 148° |
| 8 | No.I-21 | 24° | 86° | 137° |
| 9 | No.I-23 | 26° | 90° | 146° |
| 10 | No.I-81 | 25° | 88° | 144° |
| 3' | Compound (A) | 14° | 71° | 112° |
| 4' | non | 14° | 71° | 112° |

Compound (A) used in the example 3' is same as Compound (A) used in the example 1'.

Examples 11 to 17 and 5' to 7'

With the exception that Compound No. I-19 in the example 6 was replaced with the compounds of the present invention indicated in Table 3 (without change in the mixing ratio or quantity employed), optical compensatory sheets and a liquid-crystal display were prepared in the same manner as in the example 6.

The maximum and minimum tilt angles of the discotic liquid-crystal molecules in the prepared optical compensatory sheets were respectively measured. The tilt angles of the discotic liquid-crystal molecules in the optical compensatory sheets varied with the distance between the discotic liquid-crystal molecules and the surface of the transparent supports, being smallest in the vicinity of the alignment layer and largest in the vicinity of the interface with air. The mean tilt angles of the optical compensatory sheet were also measured. And the retardation's (Rth) in the thickness direction of the optical compensatory sheets were respectively measured. The results are presented in Table 3.

The viewing angles were also measured in the same manner as the example 6.

Composition of retardation-enhancing solution

| | |
|---|---|
| 2-Hydroxy-4-benzyloxybenzophenone | 12 weight parts |
| 2,4-Benzyloxybenzophenone | 4 weight part |
| Methylene chloride | 80 weight parts |
| Methanol | 20 weight parts |

To 474 weight parts of the cellulose acetate solution were added 22 weight parts of the retardation-enhancing solution and the two were intimately mixed to prepare dope. Three weight parts of retardation-enhancer were employed per 100 weight parts of cellulose acetate. The dope obtained was caused to flow through a nozzle onto a drum cooled to 0° C.

TABLE 3

| Example No. | Compound | Tilt angle of DLC minimum | Tilt angle of DLC maximum | Mean tilt angle β | Retardation Rth | Viewing angle Vertical direction | Viewing angle Horizontal direction |
|---|---|---|---|---|---|---|---|
| 11 | No.I-18 | 8° | 72° | 27° | 129 nm | 91° | 148° |
| 12 | No.I-23 | 8° | 70° | 26° | 130 nm | 90° | 146° |
| 13 | No.I-46 | 8° | 67° | 24° | 132 nm | 89° | 144° |
| 14 | No.I-50 | 8° | 72° | 27° | 129 nm | 91° | 148° |
| 15 | No.I-59 | 8° | 73° | 27° | 129 nm | 91° | 148° |
| 16 | No.I-67 | 5° | 63° | 23° | 134 nm | 85° | 135° |
| 17 | No.I-94 | 8° | 72° | 27° | 129 nm | 91° | 148° |
| 5' | Compound(A) | 4° | 51° | 19° | 141 nm | 71° | 112° |
| 6' | Compound(C) | 4° | 49° | 18° | 143 nm | 68° | 109° |
| 7' | non | 4° | 51° | 19° | 141 nm | 71° | 112° |

Compound (A) used in the example 5' is same as Compound (A) used in the example 1'.

Compound (C) used in the example 7' is shown bellow;

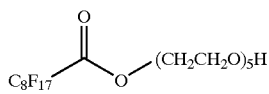

which is disclosed in JP-A No. 2001-330725 as FS-32.

Example 18

(Preparation of Transparent Support)

The following components were charged to a mixing tank and stirred with heating to prepare a cellulose acetate solution. Composition of cellulose acetate solution

| | |
|---|---|
| Cellulose acetate with a 60.9 percent degree of acetation | 100 weight parts |
| Triphenyl phosphate | 7.8 weight parts |
| Biphenyldiphenyl phosphate | 3.9 weight parts |
| Methylene chloride | 300 weight parts |
| Methanol | 54 weight parts |
| 1-Butanol | 11 weight parts |

The following components were charged to a separate mixing tank and stirred with heating to prepare a retardation-enhancing solution.

The dope was peeled off while having a solvent content of 70 weight percent, the two edges of the film in the transverse direction were fixed with a pin tenter, and in the area where the solvent content was from 3 to 5 weight percent, the film was dried while maintaining a spacing yielding a stretching rate of 3 percent in the traverse direction (direction perpendicular to the machine direction). Subsequently, the film was further dried by passing it between the rolls of a heat treatment device and adjusted to achieve a ratio between the stretching rate in the transverse direction and the stretching rate in the machine direction of 0.75 with an essentially 0 percent stretching rate in the machine direction in the area in which the glass transition temperature exceeded 120° C. (taking into account 4 percent stretching in the machine direction during separation), yielding a cellulose acetate film 107 micrometers thick. Measurement of the retardation of the film thus prepared at a wavelength of 632.8 nm revealed a thickness retardation of 80 nm and an in-plane retardation of 11 nm. The cellulose acetate film thus prepared was employed as transparent support.

(Formation of First Undercoating Layer)

A coating liquid of the composition indicated below was applied to 28 ml/m² on the transparent support and dried to form a first undercoating layer.

Composition of first undercoating layer coating liquid

| | |
|---|---|
| Gelatin | 5.42 weight parts |
| Formaldehyde | 1.36 weight parts |
| Salicylic acid | 1.60 weight parts |
| Acetone | 391 weight parts |
| Methanol | 158 weight parts |

-continued

| Methylene chloride | 406 weight parts |
| Water | 12 weight parts |

(Formation of Second Undercoating Layer)

A coating liquid of the composition indicated below was applied to 7 ml/M² on the first undercoating layer and dried to form a second undercoating layer.

Composition of second undercoating layer coating liquid

| Anionic polymer employed in the example 1 | 0.79 weight part |
| Citric acid monoethyl ester | 10.1 weight parts |
| Acetone | 200 weight parts |
| Methanol | 877 weight parts |
| Water | 40.5 weight parts |

(Formation of Back Layer)

A coating liquid of the composition indicated below was applied to 25 ml/m² on the surface of the opposite side of the transparent support and dried to form a back layer.

Composition of back layer coating liquid

| Cellulose diacetate with 55 percent degree of acetation | 6.56 weight parts |
| Silica-based matting agent (average particle size: 1 micrometer) | 0.65 weight parts |
| Acetone | 679 weight parts |
| Methanol | 104 weight parts |

(Formation of Alignment Layer)

An aqueous solution of long-chain-alkyl-modified polyvinyl alcohol was applied on the second undercoating layer and dried for 90 sec with 60° C. hot air, after which a rubbing treatment was applied to form an alignment layer. The rubbing direction of the alignment layer was parallel to the flow direction of the transparent support.

(Formation of Optically Anisotropic Layer)

The coating solution of the optically anisotropic layer employed in the example 1 was applied with a #4 wire bar to the alignment layer. The quantity of Compound No. I-19 applied was 1.7 mg/m². The coated layer was heated for 3 min in a thermostatic chamber at 130° C. and the discotic liquid-crystal compound was aligned. Subsequently, a 120 W/cm high-pressure mercury lamp was used to irradiate the coated layer for 1 min with UV radiation, causing the discotic liquid-crystal compound to polymerize and thus fixing it in an oriented state. The liquid-crystal compound was cooled to room temperature to complete preparation of the optical compensatory sheet.

The mean tilt angle ($\beta$) of the optical compensatory sheet was measured. The result was shown in Table 4.

(Preparation of Elliptical Polarizing Plates)

Iodine was adsorbed onto a stretched polyvinyl alcohol film to prepare a polarizing film. One side of the polarizing film was bonded with a polyvinyl alcohol-based adhesive to the transparent support surface of the optical compensatory sheet that had been prepared. The transmission axis of the polarizing film was positioned parallel to the slow axis of the optical compensatory sheet. A transparent protective film was bonded to the opposite surface of the polarizing film with polyvinyl alcohol-based adhesive. Elliptical polarizing plates were thus prepared.

(Preparation of Liquid-Crystal Display)

A polyimide alignment layer was provided on a glass substrate equipped with transparent ITO electrodes and treated by rubbing. Five micrometer spacers were positioned and two such substrates were positioned with their alignment layers facing. The two substrates were positioned so that the rubbing directions of their alignment layers were perpendicular. Rod-shaped liquid-crystal molecules (ZL4792 made by Merck Co.) were poured into the gap between the substrates to form a rod-shaped liquid-crystal layer. The $\Delta$n of the rod-shaped liquid-crystal molecules was 0.0969. Two elliptical polarizing plates prepared as set forth above were bonded to either side of the TN liquid-crystal cell prepared as set forth above so that the optically anisotropic surfaces faced the substrates of the liquid-crystal cell. The slow axis of the optical compensatory sheet was made perpendicular to the rubbing direction of the alignment layer of the liquid-crystal cell. A voltage was applied to the liquid-crystal cell of the liquid-crystal display, the transmittance of a 2 V white display and 5 V black display was adopted as the contrast ratio, a contrast ratio of 10 was measured vertically and horizontally, and the area without gradation reversal was measured as the viewing angle. The results are given in Table 4.

Examples 19 to 22, 8' and 9'

With the exception that Compound No. I-19 in the example 19 was replaced with the compounds of the present invention indicated in Table 4 (without change in the mixing ratio or quantity employed), elliptical polarizing plates and a liquid-crystal display were prepared in the same manner as in the example 19. The mean tilt angles and viewing angles of the examples 20 to 24, 8' and 9' were measured in the same manner as the example 19. The results are given in Table 4.

TABLE 4

| | | | Viewing angle | |
| Example No. | Air interface control agent | Mean tilt angle $\beta$ | Vertical direction | Horizontal direction |
| --- | --- | --- | --- | --- |
| 18 | No.I-19 | 15° | 80° | 135° |
| 19 | No.I-20 | 19° | 91° | 148° |
| 20 | No.I-21 | 16° | 85° | 140° |
| 21 | No.I-23 | 17° | 87° | 142° |
| 22 | No.I-81 | 19° | 91° | 148° |
| 8' | Compound (A) | 14° | 71° | 112° |
| 9' | Non | 14° | 71° | 112° |

Compound (A) used in the example 8' is same as Compound (A) used in the example 1'.

Examples 23 to 29 and 10' to 12'

With the exception that Compound No. I-19 in the example 18 was replaced with the compounds of the present invention indicated in Table 5 (without change in the mixing ratio or quantity employed), elliptical polarizing plates and a liquid-crystal display were prepared in the same manner as in the example 18.

The maximum and minimum tilt angles of the discotic liquid-crystal molecules in the optical compensatory sheets were measured. The tilt angles of the discotic liquid-crystal molecules in the optically anisotropic layers varied with the distance between the discotic liquid-crystal molecules and the surface of the transparent supports, being smallest in the vicinity of the alignment layer and largest in the vicinity of the interface with air. The mean tilt angles (β) of the optical compensatory sheets were also measured. And the retardation's (Rth) in the thickness direction of the optical compensatory sheets were also measured. The results are presented in Table 5.

The viewing angles were also measured in the same manner as the example 18. The results are presented in Table 5.

TABLE 5

| Example No. | Compound | Tilt angle of DLC minimum | Tilt angle of DLC maximum | Mean tilt angle β | Retardation Rth | Viewing angle Vertical direction | Viewing angle Horizontal direction |
|---|---|---|---|---|---|---|---|
| 23 | No.I-18 | 8° | 72° | 19° | 162 nm | 91° | 148° |
| 24 | No.I-23 | 7° | 69° | 18° | 168 nm | 88° | 143° |
| 25 | No.I-46 | 6° | 67° | 17° | 170 nm | 85° | 140° |
| 26 | No.I-50 | 8° | 72° | 19° | 162 nm | 91° | 148° |
| 27 | No.I-59 | 8° | 72° | 19° | 162 nm | 91° | 148° |
| 28 | No.I-67 | 5° | 63° | 16° | 172 nm | 80° | 135° |
| 29 | No.I-94 | 8° | 72° | 19° | 163 nm | 91° | 148° |
| 10' | Compound(A) | 4° | 51° | 14° | 180 nm | 72° | 112° |
| 11' | Compound(C) | 4° | 53° | 14° | 179 nm | 72° | 114° |
| 12' | non | 4° | 51° | 14° | 180 nm | 71° | 112° |

As indicated by results presented in Table 1, the optically anisotropic layers containing air interface control agents, especially compounds represented by the formula (I), had air interface polarities of at least 1.5-fold relative to that of a layer not containing the agent. The mean tilt angles of the discotic liquid crystal compounds in the layers were much lager than that in a layer not containing the agent. As indicated by results presented in Table 2 to 5, the optical compensatory sheets and elliptical polarizing plates comprising such optically anisotropic layers contributed to improvement in viewing angles of TN-mode LCD's.

As explained above, according to the present invention, an air interface agent is added to an optically anisotropic layer to increase an air interface polarity of the layer, thereby increasing the tilt angle of discotic liquid-crystal molecules and adjusting the tilt angle of discotic liquid crystal molecules.

Especially, a compound denoted by formula (I) is employed to increase the tilt angle of discotic liquid-crystal molecules and adjust the tilt angle of discotic liquid crystal molecules. Correct optical compensation of a TN-mode liquid-crystal cell is more desirably accomplished by increasing the tilt angle of the discotic liquid-crystal molecules than by employing a conventional optical compensatory sheet. Since it is possible to increase the tilt angle of discotic liquid-crystal molecules in the present invention, an optical compensatory sheet can be achieved that is correctly adapted to a TN-mode liquid-crystal cell. The use of such an optical compensatory sheet prevents light from leaking in the direction of incline of the polarizing plates and permits substantial broadening (beyond prior art) of the viewing angle of the liquid-crystal display. The present invention further provides an elliptical polarizing plate capable of increasing the viewing angle of the liquid-crystal device, and a liquid-crystal device having a broadened viewing angle.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical compensatory sheet comprising a transparent support and an optically anisotropic layer formed of discotic liquid-crystal molecules thereon, wherein said anisotropic layer comprises at least one air interface control agent, thereby having an air interface polarity of at least 1.5-fold relative to that of a layer which does not comprise said air interface control agent.

2. The optical compensatory sheet of claim 1, wherein said air interface control agent is a fluorine based surfactant.

3. The optical compensatory sheet of claim 1, wherein the amount of the air interface control agent is from 0.01 to 1 weight % with respect to the total weight of the discotic liquid crystal compounds.

4. The optical compensatory sheet of claim 1, wherein said discotic liquid-crystal molecules have a molecular structure comprising a disk-shaped nucleus containing at least one benzene ring and a side chain containing a double bond conjugated thereto.

5. The optical compensatory sheet of claim 1, wherein the tilt angle of said discotic liquid-crystal molecules varies with the distance between said discotic liquid-crystal molecules and the surface of said transparent support.

6. The optical compensatory sheet of claim 1, wherein said air interface control agent is a compound denoted by formula (II) or (IIIa) below:

Formula (II)

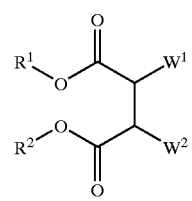

wherein $R^1$ and $R^2$ each independently denotes an alkyl group having a terminal $CF_3$ group, $W^1$ and $W^2$ each denotes a hydrogen atom, hydrophilic group, alkyl group having a hydrophilic group, or an alkoxy group having a hydrophilic group, and $W^1$ and $W^2$ are not simultaneously hydrogen atoms;

Formula (IIIa)

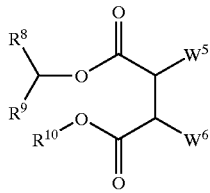

wherein $R^8$ and $R^9$ each independently denotes an alkyl group having a terminal $CF_3$ group, $R^{10}$ denotes an optionally substituted alkyl group, $W^5$ and $W^6$ each denotes a hydrogen atom, hydrophilic group, alkyl group having a hydrophilic group, or an alkoxy group having a hydrophilic group, and $W^5$ and $W^6$ are not simultaneously hydrogen atoms.

7. The optical compensatory sheet of claim 6, wherein $R^1$, $R^2$, $R^8$ and $R^9$ each denotes a C1–20 alkyl group having a terminal $CF_3$ group.

8. The optical compensatory sheet of claim 6, wherein $R^1$, $R^2$, $R^8$ and $R^9$ each denotes a C4–16 alkyl group having a terminal $CF_3$ group.

9. The optical compensatory sheet of claim 6, wherein $R^1$, $R^2$, $R^8$ and $R^9$ each denotes a C6–16 alkyl group having a terminal $CF_3$ group.

10. The optical compensatory sheet of claim 6, wherein $R^1$, $R^2$, $R^8$ and $R^9$ each denotes n-$C_8F_{17}$, n-$C_6F_{13}$, n-$C_8F_{17}$—$(CH_2)_2$, n-$C_6F_{13}$—$(CH_2)_2$, n-$C_4F_9$—$(CH_2)_2$ or $C_3F_7$.

11. The optical compensatory sheet of claim 6, wherein $R^{10}$ denotes a fluorine-substituted C3–24 alkyl group.

12. The optical compensatory sheet of claim 6, wherein $R^{10}$ denotes a group selected from Group I below:

Group I

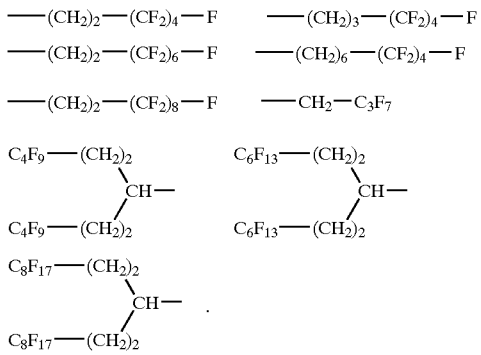

13. The optical compensatory sheet of claim 6, wherein $W^1$ and/or $W^2$ and $W^5$ and/or $W^6$ denote an anionic hydrophilic group.

14. The optical compensatory sheet of claim 6, wherein $W^1$ and/or $W^2$ and $W^5$ and/or $W^6$ denote $(CH_2)_nSO_3M$ in which n is 1 or 0, M denotes a cation, but when the charge in the molecule is 0, M may be absent.

15. An optical compensatory sheet comprising a transparent support and an optically anisotropic layer formed of discotic liquid-crystal molecules thereon, wherein said anisotropic layer comprises at least one compound denoted by formula (I):

Formula (I)

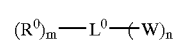

wherein $R^0$ denotes an alkyl group, alkyl group having a terminal $CF_3$ group, or alkyl group having a terminal $CHF_2$ group and not fewer than 8 carbon atoms; m denotes an integer greater than or equal to 2, where multiple occurrences of $R^0$ may be identical or different, with at least one denoting an alkyl group having a terminal $CF_3$ group, or with at least two denoting alkyl groups having a terminal $CHF_2$ group and not fewer than 8 carbon atoms; $L^0$ denotes a linking group of valence (m+n); W denotes a hydrophilic group; and n denotes an integer greater than or equal to 1.

16. The optical compensatory sheet of claim 15, wherein the amount of the compound is from 0.01 to 1 weight % with respect to the total weight of the discotic liquid crystal compounds.

17. The optical compensatory sheet of claim 15, wherein said discotic liquid-crystal molecules have a molecular structure comprising a disk-shaped nucleus containing at least one benzene ring and a side chain containing a double bond conjugated thereto.

18. The optical compensatory sheet of claim 15, wherein the tilt angle of said discotic liquid-crystal molecules varies with the distance between said discotic liquid-crystal molecules and the surface of said transparent support.

19. The optical compensatory sheet of claim 15, wherein at least one of $R^0$ denotes a C1–20 alkyl group having a terminal $CF_3$ group.

20. The optical compensatory sheet of claim 15, wherein at least one of $R^0$ denotes a C4–16 alkyl group having a terminal $CF_3$ group.

21. The optical compensatory sheet of claim 15, wherein at least one of $R^0$ denotes a C6–16 alkyl group having a terminal $CF_3$ group.

22. The optical compensatory sheet of claim 15, wherein at least one of $R^0$ denotes n-$C_8F_{17}$, n-$C_6F_{13}$, n-$C_8F_{17}$—$(CH_2)_2$, n-$C_6F_{13}$—$(CH_2)_2$, n-$C_4F_9$—$(CH_2)_2$ or $C_3F_7$.

23. The optical compensatory sheet of claim 15, wherein $L^0$ denotes a combination of at least two groups selected from the group consisting of alkylene groups, alkenylene groups, (m+n) valence aromatic groups, bivalent heterocyclic residues, —CO—, —$NR^a$— where $R^a$ denotes an alkyl group having from 1 to 5 carbon atoms or a hydrogen group, —O—, —S—, —SO— and —$SO_2$—.

24. The optical compensatory sheet of claim 15, wherein $L^0$ denotes a linking group denoted by any one of L1 to L 13 below:

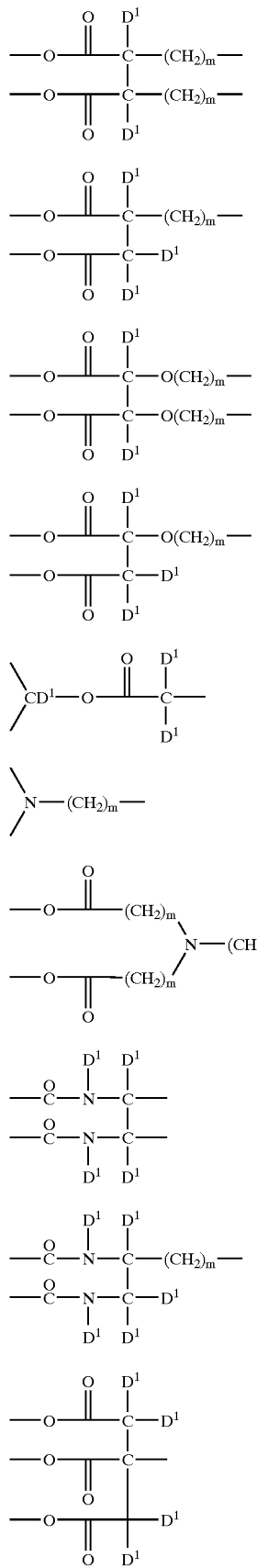

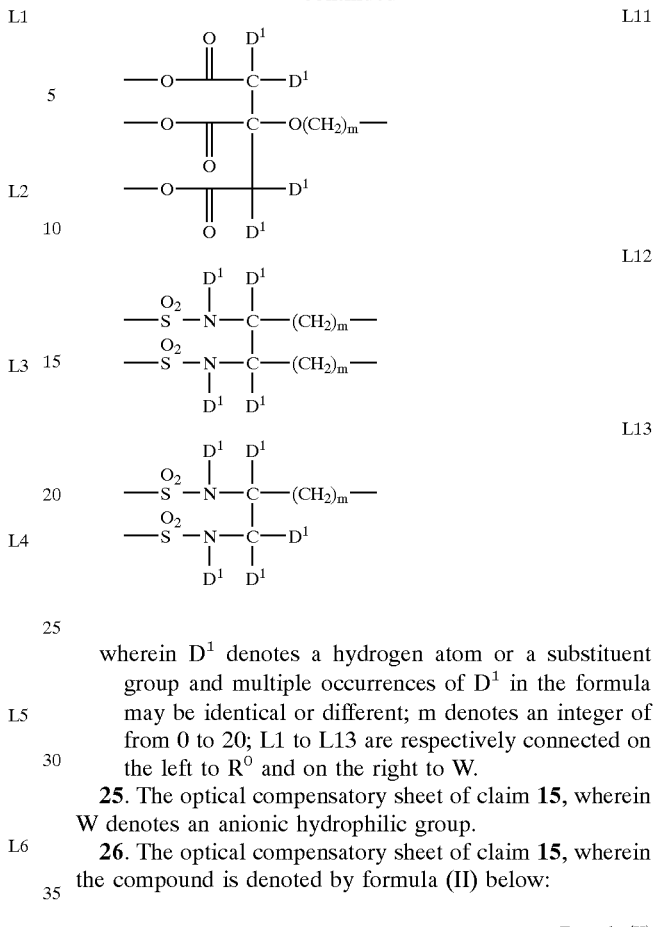

wherein $D^1$ denotes a hydrogen atom or a substituent group and multiple occurrences of $D^1$ in the formula may be identical or different; m denotes an integer of from 0 to 20; L1 to L13 are respectively connected on the left to $R^0$ and on the right to W.

25. The optical compensatory sheet of claim 15, wherein W denotes an anionic hydrophilic group.

26. The optical compensatory sheet of claim 15, wherein the compound is denoted by formula (II) below:

Formula (II)

wherein $R^1$ and $R^2$ each independently denotes an alkyl group having a terminal $CF_3$ group, $W^1$ and $W^2$ each denotes a hydrogen atom, hydrophilic group, alkyl group having a hydrophilic group, or an alkoxy group having a hydrophilic group, and $W^1$ and $W^2$ are not simultaneously hydrogen atoms.

27. The optical compensatory sheet of claim 15, wherein the compound is denoted by formula (III) below:

Formula (III)

wherein $R^3$ and $R^4$ each independently denotes an alkyl group having a terminal $CF_3$ group, $L^1$ denotes a single bond or a bivalent linking group, and $W^3$ denotes a hydrophilic group or hydrogen atom.

28. The optical compensatory sheet of claim 15, wherein the compound is denoted by formula (IIIa) below:

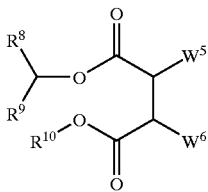

Formula (IIIa)

wherein $R^8$ and $R^9$ each independently denote an alkyl group having a terminal $CF_3$ group, $R^{10}$ denotes an optionally substituted alkyl group, $W^5$ and $W^6$ each denotes a hydrogen atom, hydrophilic group, alkyl group having a hydrophilic group, or an alkoxy group having a hydrophilic group, and $W^5$ and $W^6$ are not simultaneously hydrogen atoms.

29. The optical compensatory sheet of claim 15, wherein the compound is denoted by formula (IV) below:

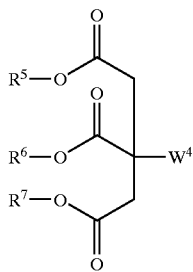

Formula (IV)

wherein $R^5$, $R^6$ and $R^7$ each independently denotes an alkyl group having a terminal $CF_3$ group and $W^4$ denotes a hydrophilic group, alkyl group having a hydrophilic group, or alkoxy group having a hydrophilic group.

30. An elliptical polarizing plate comprising a polarizing film and an optical compensatory sheet of claim 1.

31. An elliptical polarizing plate comprising a polarizing film and an optical compensatory sheet of claim 15.

32. A transmitting liquid-crystal display equipped with a TN-mode liquid-crystal cell with two polarizing plates, one positioned on either side thereof, wherein the optical compensatory sheet of claim 1, is positioned between at least one of said two polarizing plates and said liquid-crystal cell.

33. A transmitting liquid-crystal display equipped with a TN-mode liquid-crystal cell with two polarizing plates, one positioned on either side thereof, wherein the optical compensatory sheet of claim 15 is positioned between at least one of said two polarizing plates and said liquid-crystal cell.

34. A transmitting liquid-crystal display comprising a TN-mode liquid-crystal cell with two polarizing plates, one positioned on either side thereof, wherein at least one of said two polarizing plates is an elliptical polarizing plate in which are sequentially laminated an optically anisotropic layer formed of discotic liquid-crystal molecules, a transparent substrate, a polarizing film, and a transparent protective film; the tilt angle of said discotic liquid-crystal molecules varies with the distance between said discotic liquid-crystal molecules and the surface of said transparent support; and said optically anisotropic layer further comprises a compound denoted by formula (I):

Formula (I)

wherein $R^0$ denotes an alkyl group, alkyl group having a terminal $CF_3$ group, or alkyl group having a terminal $CHF_2$ group and not fewer than 8 carbon atoms; m denotes an integer greater than or equal to 2, where multiple occurrences of $R^0$ may be identical or different, with at least one denoting an alkyl group having a terminal $CF_3$ group, or with at least two denoting alkyl groups each having a terminal $CHF_2$ group and not fewer than 8 carbon atoms; $L^0$ denotes a linking group of valence (m+n); W denotes a hydrophilic group; and n denotes an integer greater than or equal to 1.

* * * * *